(12) United States Patent
De Sheng Deng et al.

(10) Patent No.: US 11,138,258 B2
(45) Date of Patent: Oct. 5, 2021

(54) SYSTEM AND METHOD OF GROUPING IMAGES

(71) Applicant: CANON KABUSHIKI KAISHA, Tokyo (JP)

(72) Inventors: Dixon De Sheng Deng, East Ryde (AU); Julie Rae Kowald, Dundas Valley (AU); Nicholas Grant Fulton, Turramurra (AU); Oscar Alejandro De Lellis, Drummoyne (AU)

(73) Assignee: Canon Kabushiki Kaisha, Tokyo (JP)

(*) Notice: Subject to any disclaimer, the term of this patent is extended or adjusted under 35 U.S.C. 154(b) by 222 days.

(21) Appl. No.: 16/221,263

(22) Filed: Dec. 14, 2018

(65) Prior Publication Data

US 2019/0188223 A1 Jun. 20, 2019

(30) Foreign Application Priority Data

Dec. 18, 2017 (AU) .................. 2017279562

(51) Int. Cl.
| | | |
|---|---|---|
| *G06K 9/00* | (2006.01) |
| *G06F 16/55* | (2019.01) |
| *G06F 16/58* | (2019.01) |
| *G06F 16/535* | (2019.01) |
| *G06K 9/32* | (2006.01) |

(52) U.S. Cl.
CPC ............ *G06F 16/55* (2019.01); *G06F 16/535* (2019.01); *G06F 16/58* (2019.01); *G06K 9/00624* (2013.01); *G06K 9/3208* (2013.01)

(58) Field of Classification Search
CPC .. G06K 9/00624; G06K 9/3208; G06F 16/55; G06F 16/535; G06F 16/58

USPC .......................................................... 382/103
See application file for complete search history.

(56) References Cited

U.S. PATENT DOCUMENTS

| | | | |
|---|---|---|---|
| 6,750,898 B1* | 6/2004 | Ishida ................. | A01B 79/005 348/89 |
| 7,663,671 B2 | 2/2010 | Gallagher | |
| 8,886,576 B1 | 11/2014 | Sanketi | |
| 10,412,318 B1* | 9/2019 | Ong ...................... | H04N 5/2628 |
| 2006/0138975 A1* | 6/2006 | Lim ....................... | B25J 9/162 318/66 |
| 2008/0236275 A1* | 10/2008 | Breed ................... | B60N 2/2806 73/290 V |
| 2015/0294143 A1 | 10/2015 | Wells | |

(Continued)

OTHER PUBLICATIONS

Daniel W.T. Wundersitz; Classification of team sport activities using a single wearable tracking device; Journal of Biomechanics; Dec. 9, 2014 pp. 1-22.

*Primary Examiner* — Ali Bayat

(74) *Attorney, Agent, or Firm* — Canon U.S.A., Inc. IP Division

(57) ABSTRACT

A system and method of grouping images captured using an image capture device. The method comprises receiving a plurality of images, each of the plurality of images having associated camera settings; and determining an inertial profile for the plurality of images based on acceleration data of the image capture device and an imaging entity at predetermined length of time before and after capture of the each of the plurality of images. The method further comprises forming image groups from the received plurality of images based on the determined inertial profile, and the associated camera settings.

19 Claims, 16 Drawing Sheets

(56) References Cited

U.S. PATENT DOCUMENTS

2016/0050704 A1\* 2/2016 von Sneidern .... H04N 1/00148
370/329
2016/0239976 A1\* 8/2016 Fathi ........................ G06T 7/579
2016/0261793 A1\* 9/2016 Sivan ................. H04N 5/23219

\* cited by examiner

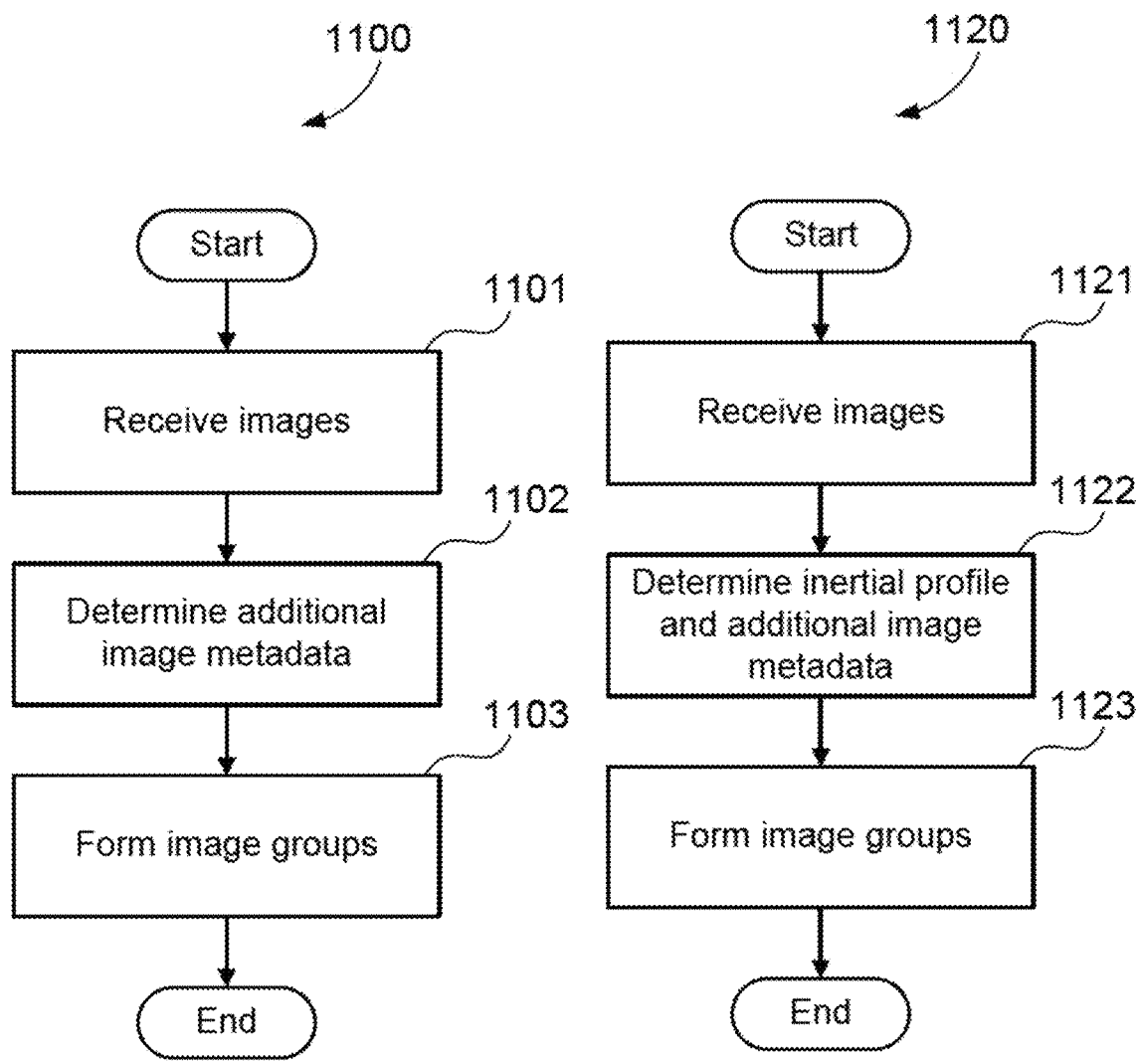

SYSTEM AND METHOD OF GROUPING IMAGES

This application claims the benefit under 35 U.S.C. § 119 of the filing date of Australian Patent Application No. 2017279562, filed 18 Dec. 2017, hereby incorporated by reference in its entirety as if fully set forth herein.

TECHNICAL FIELD

The present invention relates to the field of processing and sorting images, in particular to a system and method of grouping or sorting images in response to a query-based image search.

BACKGROUND

With the advent of digital cameras and low cost digital file storage devices, photographic images can be easily captured and stored in vast quantities. One application that has benefited greatly from the capability to store large quantities of images is management of a wide variety of industrial, infrastructure and agricultural assets. By capturing vast numbers of images of an asset, the task of managing the ongoing maintenance or development of that asset can be assisted by using the images for tracking, as evidence of problems that need to be addressed, and as data for making future projections.

However, the number of images and other data involved can lead to additional problems. Once the images are collected from the various cameras involved, the result is often a meaningless or unstructured collection of photographs, making it difficult to effectively find relevant images relating to a specific task of managing the asset in question. Finding the relevant images may become a case of examining a large number of images individually, or relying on incomplete or unhelpful metadata, perhaps limited to a time and date of capture. Examining the images individually or relying on complete or unhelpful metadata can still yield a large quantity of otherwise unfiltered results, with images captured for other purposes mixed in with the set of images to examine.

Alternatively, images may be manually annotated as they are captured, or as the images are transferred to a central database or storage. However, manual annotation can be costly or labour intensive. Additionally, workers carrying out the task of surveying the asset and capturing images may be unskilled, unreliable, or prone to making errors in this annotation.

In some known approaches, location metadata can be used to cluster images into groups based on location of image capture, and a relationship between the image and geographic features. However, the known approaches do not distinguish between images captured for different purposes, leading to irrelevant images included in results of queries based on such location-based groupings.

Other known approaches involve the automatic recognition and tagging of image content, saving the labour and costs of performing such tasks manually. However, the images captured in asset management are often nondescript or lack distinguishing features (being all of similar metal beams, fruit samples or so forth, depending on the domain). The resulting groupings therefore are not useful in an asset management context, which often requires differentiation based on a type of image collection activity, rather than the content description.

A need exists to increase the utility of image data collected for asset management, without imposing additional complexity or workload during the image data collection tasks.

SUMMARY

It is an object of the present invention to substantially overcome, or at least ameliorate, one or more disadvantages of existing arrangements.

One aspect of the present disclosure provides a method of grouping images captured using an image capture device, the method comprising: receiving a plurality of images, each of the plurality of images having associated camera settings; determining an inertial profile for the plurality of images based on acceleration data of the image capture device and an imaging entity at pre-determined length of time before and after capture of the each of the plurality of images; and forming image groups from the received plurality of images based on the determined inertial profile, and the associated camera settings.

According to another aspect, the associated camera settings comprise at least one of a focus distance value, focal length, exposure or brightness values, and focus depth data.

According to another aspect, the inertial profile comprises an orientation component relating to an orientation of the camera.

According to another aspect, the imaging entity comprises the image capture device.

According to another aspect, the imaging entity further comprises at least one of a person operating the image capture device, and a vehicle to which the image capture device is mounted.

According to another aspect, forming image groups is further based on interaction of a user of the image capture device with one or more shutter buttons of the image capture device.

According to another aspect, the image capture device comprises a plurality of shutter buttons configurable such that each shutter button records an image-subject type in metadata of the image.

According to another aspect, the method further comprises associating each of the formed image groups with one of a pre-determined set of tasks.

According to another aspect, the method further comprises grouping the images by distinguishing a task from a set of pre-determined tasks based on the determined inertial profile.

According to another aspect, forming image groups is further based on a task tag stored during capture of each of the plurality of images.

According to another aspect, the method further comprises normalising inertial profiles determined for each of the plurality of images, and wherein the image groups are formed using the normalised inertial profiles.

According to another aspect, the method further comprises determining if a current inertial profile starts to differ from a previously known inertial profile, and alerting the imaging entity.

According to another aspect, the method further comprises determining a matching score between a current inertial profile and a model to determine if the imaging entity is to be alerted.

According to another aspect, the method further comprises determining if the determined inertial profile over a time period prior to a current time matches a model to determine if the imaging entity has missed an expected image.

According to another aspect, the image groups are further formed based on the imaging entity associated with the determined profile of each image.

According to another aspect, the imaging entity includes the image capturing device mounted on a tractor and the plurality of images are of crops According to another aspect, one or more of the image groups are formed in response to a search query of the plurality of images.

According to another aspect, the acceleration data of the image capture device is sensed by one of an accelerometer and a gyroscope associated with the image capture device.

According to another aspect, the image groups are formed further based on a frequency of interaction of a user of the image capture device with one or more shutter buttons of the image capture device.

According to another aspect, the image groups are formed further based on identifying a pattern of inertial profiles for images within each of the groups.

Another aspect of the present disclosure provides a non-transitory computer readable storage medium storing program instructions for grouping images captured using an image capture device, the program comprising: code for receiving a plurality of images, each of the plurality of images having associated camera settings; code for determining an inertial profile for the plurality of images based on acceleration data of the image capture device and an imaging entity at pre-determined length of time before and after capture of the each of the plurality of images; and code for forming image groups from the received plurality of images based on the determined inertial profile, and the associated camera settings.

Another aspect of the present disclosure provides apparatus for grouping images captured using an image capture device, comprising: a processor; and a memory device storing a software program for directing the processor to perform a method comprising the steps of: receiving a plurality of images, each of the plurality of images having associated camera settings; determining an inertial profile for the plurality of images based on acceleration data of the image capture device and an imaging entity at pre-determined length of time before and after capture of the each of the plurality of images; and forming image groups from the received plurality of images based on the determined inertial profile, and the associated camera settings.

Another aspect of the present disclosure provides a system comprising: an image capture device; a processor; and a memory device storing a software program for directing the processor to perform a method comprising the steps of: receiving a plurality of images captured by the image capture device, each of the plurality of images having associated camera settings; determining an inertial profile for the plurality of images based on acceleration data of the image capture device and an imaging entity at pre-determined length of time before and after capture of the each of the plurality of images; and forming image groups from the received plurality of images based on the determined inertial profile, and the associated camera settings.

Other aspects are also disclosed.

BRIEF DESCRIPTION OF THE DRAWINGS

One or more example embodiments of the invention will now be described with reference to the following drawings, in which:

FIGS. 11A and 11B show schematic flow diagrams of methods for grouping images via metadata and motion patterns;

DETAILED DESCRIPTION INCLUDING BEST MODE

Figure 1:
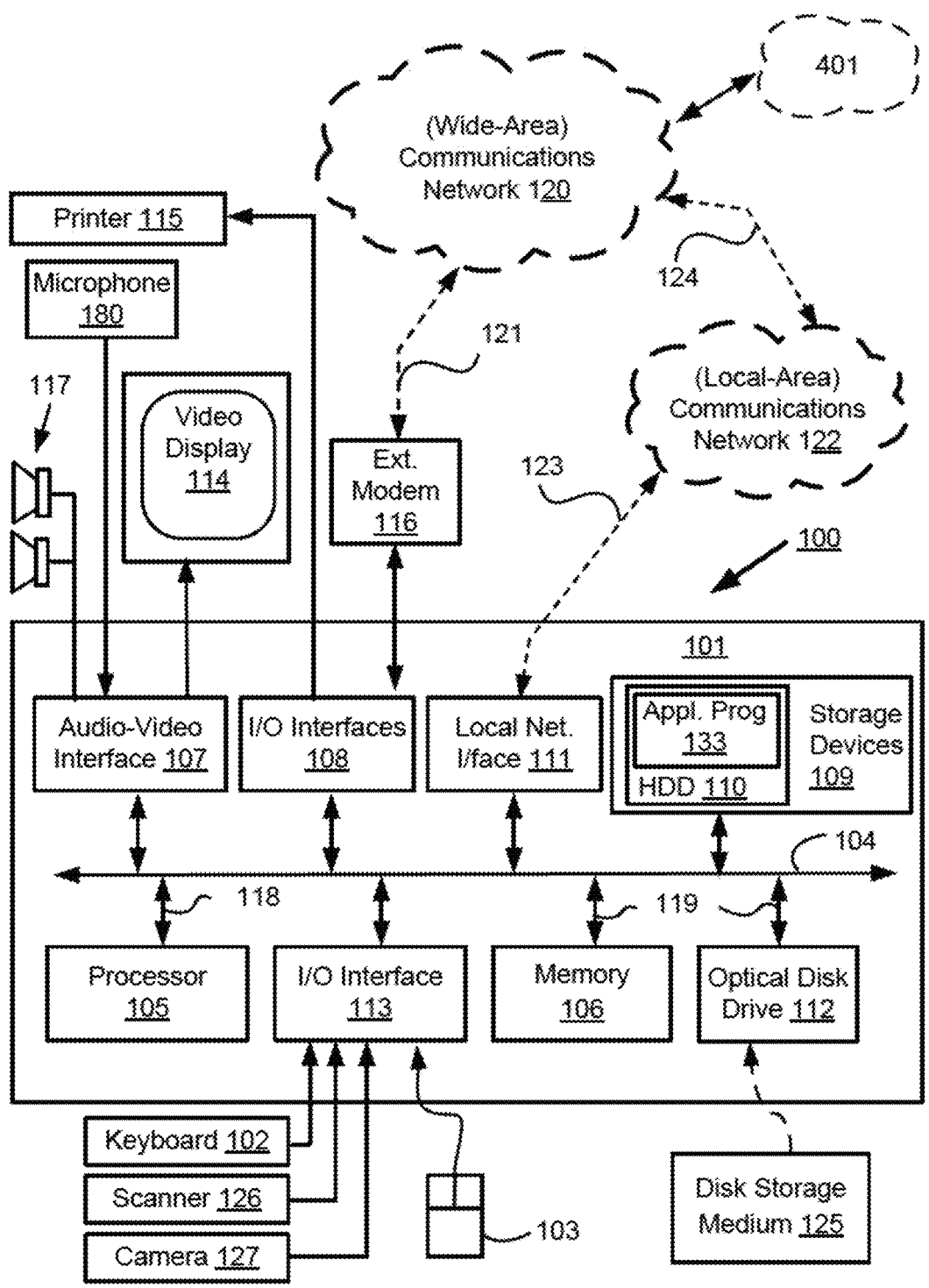
FIGS. 1 and 2 form a schematic block diagram of a general purpose computer system upon which arrangements described can be practiced.

Where reference is made in any one or more of the accompanying drawings to steps and/or features, which have the same reference numerals, those steps and/or features have for the purposes of this description the same function (s) or operation(s), unless the contrary intention appears.

Figure 4:
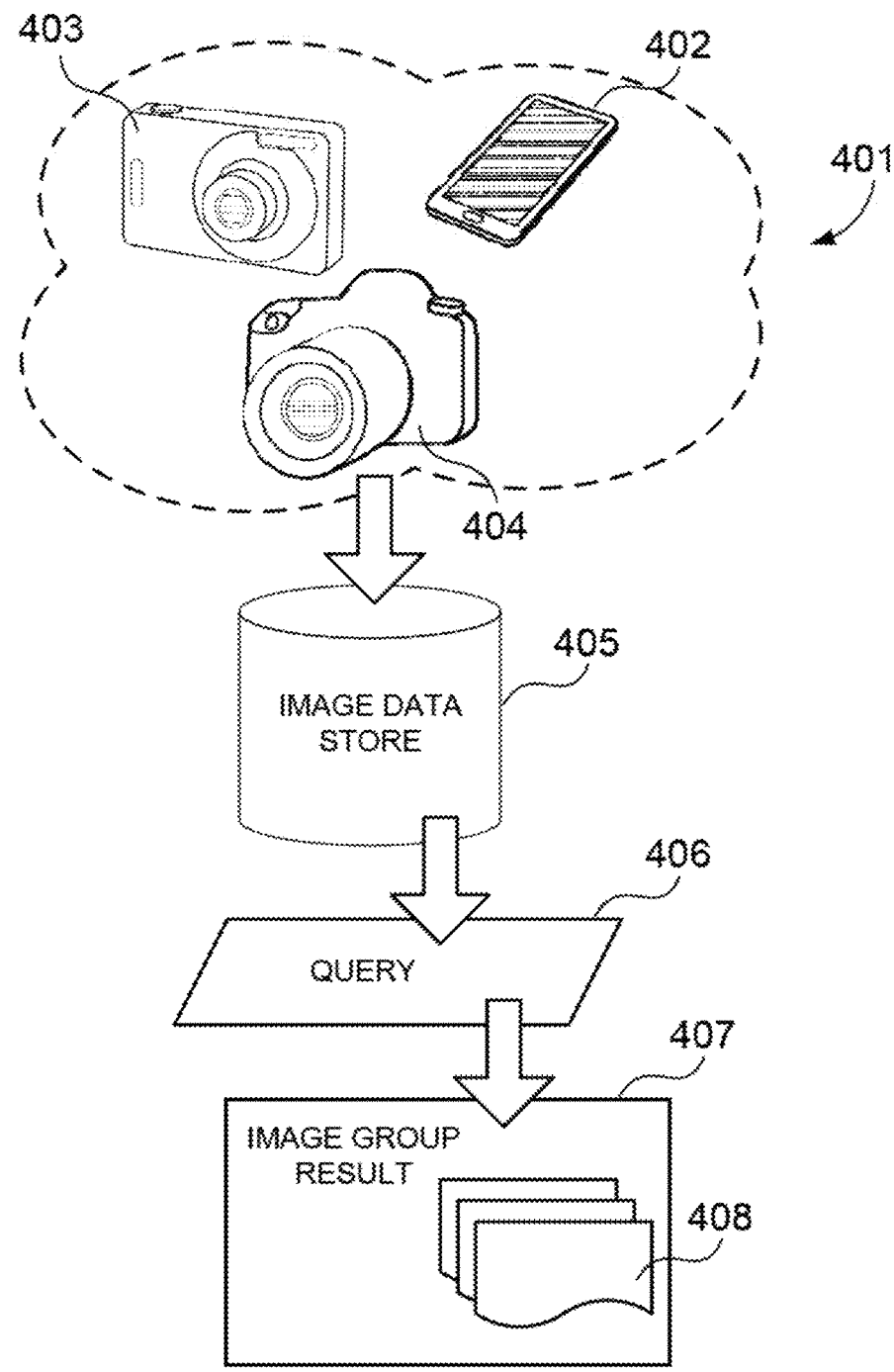
FIG. 4 depicts a context for grouping images.

FIG. 4 illustrates a context in which the arrangements described of grouping images can be carried out. An image collection task for managing an asset is performed by workers utilising one or more image data collection devices 401. The image data collection devices 401, also referred to as image capture devices, may include, as examples, a mobile computing device 402, a compact digital camera 403, and an interchangeable-lens digital camera 404. More than one of each type of device may be included in the image data collection devices 401. Image data collected by the image capture devices 401 is accumulated via file transfer, for example over a network 120 (FIG. 1), to a central image data store 405. During a task of asset management a query 406 is created, and in response, the asset management system produces a matching image group result 407 containing a set of images 408 relevant to the query 406.

Figure 2:
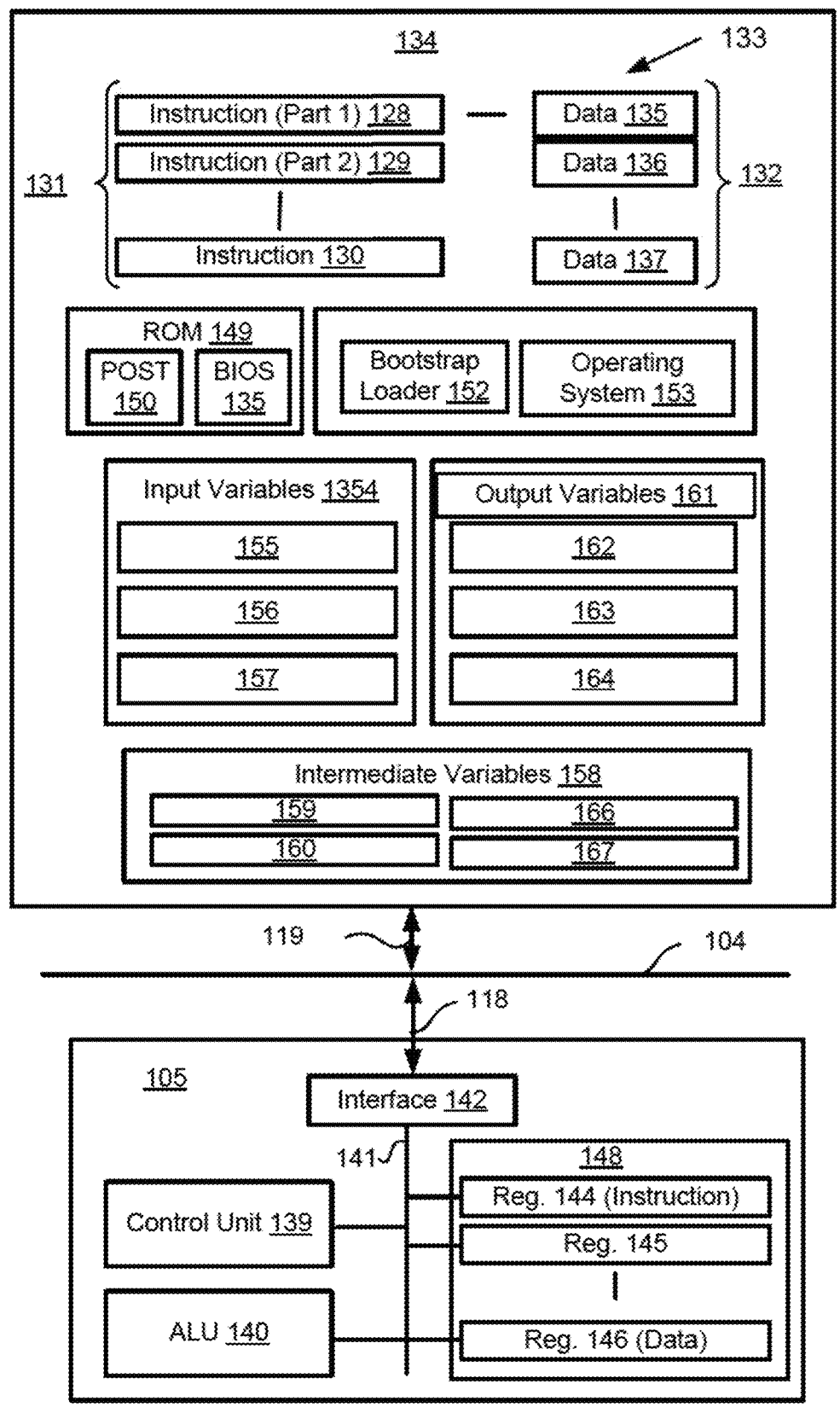

FIGS. 1 and 2 depict a general-purpose computer system 100, upon which the various arrangements described can be practiced.

As seen in FIG. 1, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The memory 106 may comprise the image data store 405 may be stored. Alternatively, the image data store 405 may be stored on an external device (not shown) and accessed by the computer module 101 via the network 120. The image capture devices 401 typically communicate with the computer module 101 via the network 120. In other arrangements, one of the image capture devices may be integral to the computer module 101.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or like computer systems.

The method of grouping images may be implemented using the computer system 100 wherein the processes of FIGS. 3, 11, 12 and 14 to be described, may be implemented as one or more software application programs 133 executable within the computer system 100. For example, the computer application may receive the query 406 and output the image group result 407. In particular, the steps of the method of grouping images are effected by instructions 131 (see FIG. 2) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for grouping images.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for grouping images.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 2 is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1.

When the computer module 101 is initially powered up, a power-on self-test (POST) program 150 executes. The POST program 150 is typically stored in a ROM 149 of the semiconductor memory 106 of FIG. 1. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 2, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1. The execution of a set of the instructions may in some cases result in output of data. Execution may also involve storing data or variables to the memory 134.

The described arrangements use input variables 154, which are stored in the memory 134 in corresponding memory locations 155, 156, 157. The described arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 2, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 3, 11, 12 and 14 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The method of grouping images may alternatively be implemented in dedicated hardware such as one or more integrated circuits performing the functions or sub functions thereof. Such dedicated hardware may include graphic processors, digital signal processors, or one or more microprocessors and associated memories.

In the arrangements described, steps for grouping images are generally described as executed on the computer module 101. However, some steps of the arrangements described may be implemented on one or more of the image capture devices 401. The image capture devices typically operate in a similar manner to the computer module 101, albeit with less processing resources. Each of the image capture devices typically comprises a lens and any type of sensor suitable for capturing images. Each of the image capture devices is typically configured to add metadata to captured images regarding camera settings, such as exposure or brightness values, and focus depth data at one or more autofocus sensor positions within an image.

Figure 3:
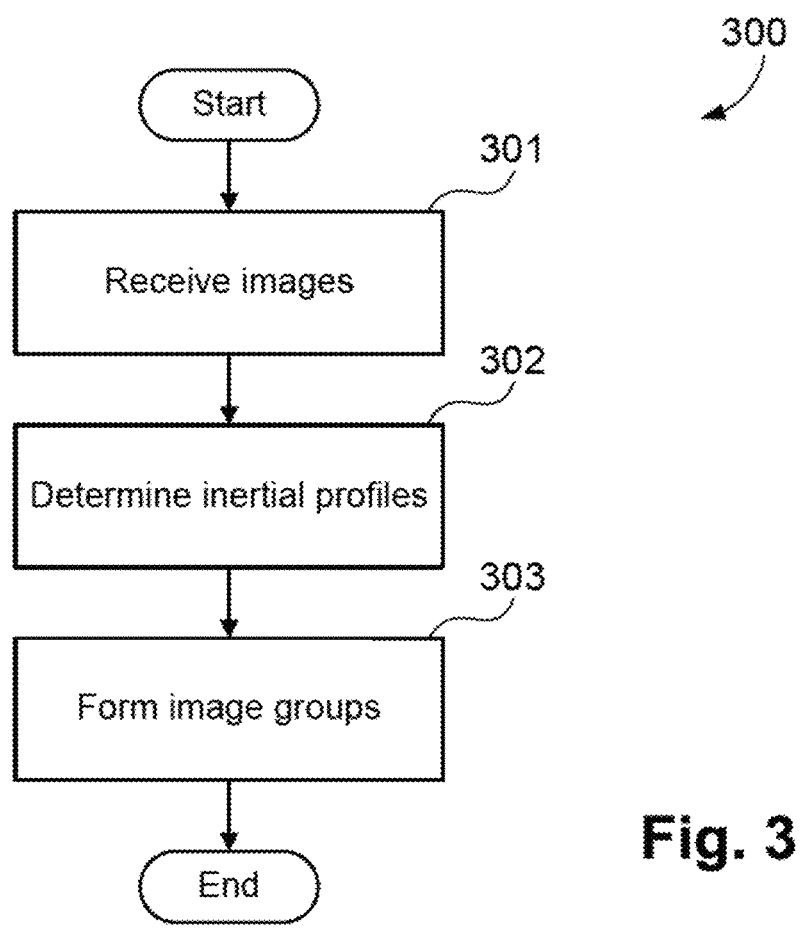
FIG. 3 is a schematic flow diagram illustrating a method of grouping images via motion patterns.

FIG. 3 shows a schematic flow diagram for a method 300 for grouping images taken using a camera or any one of the image capture devices 401. The method 300 is typically implemented as one or more modules of the application 133, stored in the memory 105 and controlled under execution of the processor 105.

The method 300 begins at receiving step 301, at which a set of images from which to form image groups is received. The set of images may, for example, be received at the image data store 405 from the one or more image capture devices 401 and subsequently received from the image data store 405 at step 301. Each image in the set has associated camera (image capture) settings. In some arrangements, data relating to the camera settings is stored within each image as metadata. The associated camera settings data may include one or more of exposure or brightness values, and focus depth data at one or more autofocus sensor positions within an image. Each image also stores an associated image capture time.

The method 300 then proceeds from step 301 to a determining step 302. In execution of step 302, an inertial profile for the received set of images is determined. The inertial profile is determined based on acceleration data collected by one or more acceleration sensors in the corresponding image capture device. The images capture devices 401 are also configured to capture acceleration data using acceleration sensors such as accelerometers or gyropscopes. In the context of the arrangements described "acceleration data" relates to data sensed by an Inertial Measurement Unit (IMU) using one or more of accelerometers, gyropscopes, magnetometers or other sensors capable of sensing movement, rate of change of movement, and pose or orientation of the camera.

In some arrangements, acceleration data is continuously sampled during operation of the image capture device. In arrangements continuously sampling acceleration data, for the duration of a sequence of camera operation in which one or more images are captured, sampled acceleration data is stored as a time sequence and associated with the respective image captures. In some arrangements the associated image capture time for each image is relative to the start time of the acceleration data sequence. In other arrangements, the time of the beginning of the acceleration data sequence and the image capture time for each image are all with respect to a global clock, and the times of image captures relative to the acceleration data can therefore be derived. In other arrangements, the acceleration sensors may be applied to the image capture device (rather than integral to the image capture device) and transmit acceleration data to the image capture device for inclusion in metadata. In other arrangements, the acceleration data may be transmitted to the image data store 405 including markers associating the acceleration data with the relevant image.

Acceleration data is sampled from one or more sensors in the image capture device, and may be directly measured or derived values that store the movement, rate of change of movement, and pose or orientation of the camera. For each image, an inertial profile is determined at step 302 based on data from the one or more sensors collected over a time period spanning a pre-determined range or length before and after the capture time for that image. The time period range is determined by the type of task being carried out and duration of tasks being carried out, as described hereafter.

The method 300 proceeds from step 302 to a grouping step 303. In execution of step 303, image groups are formed, and images from the set of images received at step 301 are placed into one or more image groups. The image groups may be optionally labelled with unique label names corresponding to each group for easy identification at a later time, for example for output to a similar search query. As described below, arrangements exist for various types of image groups and different methods of classifying images into groups. The method 300 ends after executing step 303.

Step 303 effectively operates to group or sort images based on the determined inertial profile associated with the image capture device associated with an image, and the associated camera settings. In one arrangement of carrying out the methods described, an inertial profile for each of the captured images determined at step 302 is based on a sequence of recorded sensor data representing the amount of movement of the imaging entity, derived from accelerometer readings associated with the image capture device. The image groups are subsequently formed at step 303 on the basis of the capture time of each image being located within a period of low energy movement, or high energy movement, and each image placed within the corresponding image group.

Each of the steps 301, 303 and 302 can include receiving the query 406 from an operator of the computer module 101, for example via the inputs 180, 102 or 103. In some arrangements steps 302 or 303 may not be implemented until a query has been received at the computer module 101. Group(s) of images formed or determined at step 303 that correspond to the query 406 can be output as the query response 407 at step 303. For example, the groups of images 408 may relate to images with high energy as described in relation to FIG. 8.

Figure 8:
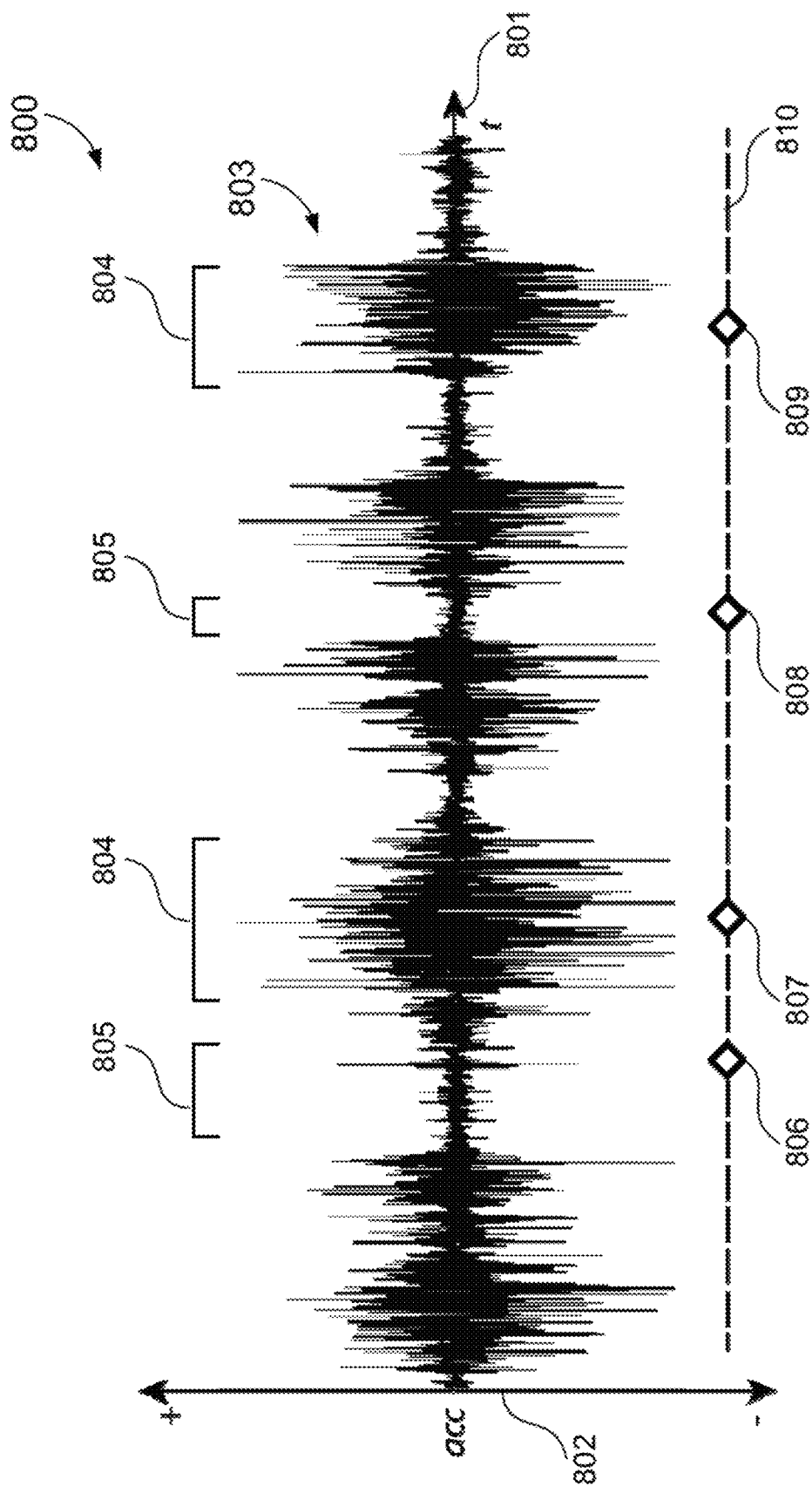
FIG. 8 illustrates an example inertial profile based on gyroscopic data.

FIG. 8 shows an example inertial profile 800. The inertial profile 800 is determined from images captured on a camera configured according to arrangements in which inertial profile is based on a sequence of recorded sensor data representing the amount of movement of the corresponding image capture devices 401y. The inertial profile 800 is generated by execution of step 302 for example. The inertial profile 800 is represented as a graph in which a horizontal axis 801 represents increasing time throughout a sequence of image captures captured by a camera, and a vertical axis 802 represents accelerometer data recorded by the camera. An inertial profile is typically generated for each device of the devices 401. Grouping images captured using a number of different devices relates to using a combination of the inertial profiles of the different devices, as described in relation to FIGS. 12A and 12B.

A movement energy plot 803 indicates the amplitude and sign of the accelerometer data varying over time. In the plot 803, low net movement energy corresponds to readings with low absolute magnitude on the axis 802, close to any point along a time axis 801. In the plot 803, high net movement energy corresponds to both positive and negative readings with relatively large absolute magnitude on the axis 802. In the example of FIG. 8, the movement energy plot 803 has example periods of low movement energy 805, and periods of high movement energy 804. The low movement energy period and high movement energy periods of FIG. 8 are not limited solely to those periods labelled explicitly as 804 and 805.

FIG. 8 also shows a supplementary time axis 810 marked with image capture times 806 to 809 for images received at step 301. The image capture times 806 to 809 correspond to times within the recorded inertial profile 800 for which the corresponding camera (image capture device) of the devices 401 captured an image. In the example of FIG. 8, images captured at the times 807 and 809 are formed into a group corresponding to periods of high energy movement at step 303, while images captured at the times 806 and 808 are formed into a group corresponding to periods of low energy movement at step 303.

Figure 9:
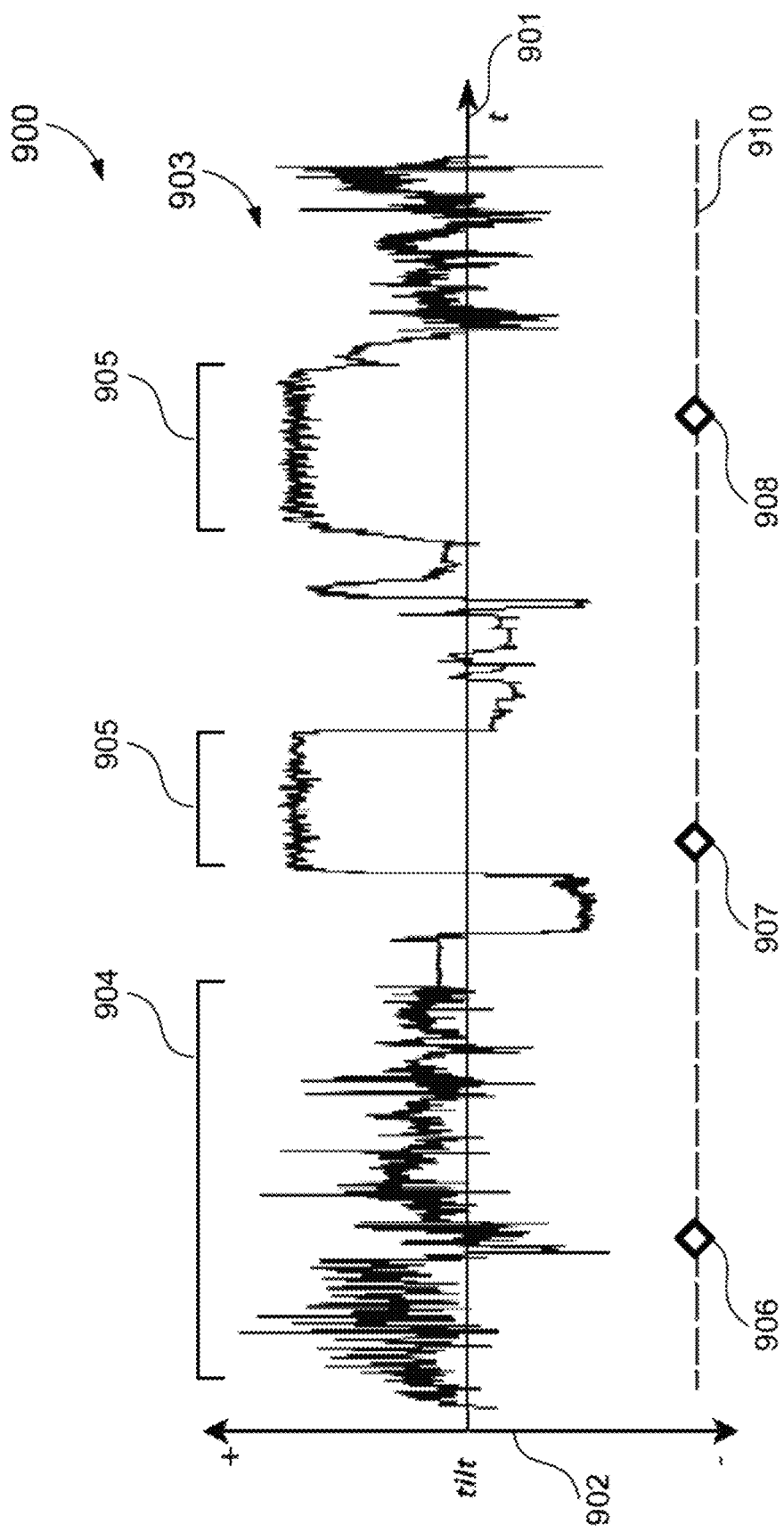
FIG. 9 illustrates an example inertial profile combined with associated camera settings; and, FIG. 10 illustrates types of images of a grape vine captured during a work task in an example workflow utilising the invention.

In a further arrangement, an inertial profile for the captured images is based on a sequence of recorded sensor data representing a pose or facing direction of the camera, also referred to as gyro or gyroscopic sensor data. FIG. 9 shows an example inertial profile captured according to the arrangement using gyroscopic sensor data. An inertial profile 903 is represented as a graph having a horizontal time axis 901, and a vertical axis 902 indicating amplitude (and sign) of the gyroscopic sensor reading. The inertial profile 903 is generated by execution of step 302 or 1122 for example. The sensor data may also be considered as indicating the tilt of the camera device with respect to a given axis of the device. Typically, devices that utilise gyroscopic sensors are capable of detecting a tilt or pose direction with respect to multiple axes. However, for ease of reference, FIG. 9 shows a single tilt axis reading.

A separate time axis 910 indicates capture times of image captures 906, 907 and 908. In the arrangement using gyroscopic sensor data, the inertial profile 903 can be segmented into periods in which the gyroscopic sensor data exhibits stable behaviour, such as periods 905, and into periods in which the gyroscopic sensor data exhibits unstable behaviour, such as periods 904. During execution of the grouping step 303, image groups may be determined based on an inertial profile in which the inertial profile can be differentiated on the basis of unstable or stable behaviour. In the example of FIG. 9, images captured at the times 907 and 908 are formed into a group corresponding to periods of stable behaviour, while images captured at the time 906 may be put into a different group corresponding to periods of unstable behaviour. The inertial profile data (based on gyroscopic sensor readings) can additionally be differentiated based on a magnitude of stable readings as the relative magnitude (position with respect to the vertical axis) may indicate, for example, the azimuth angle that the camera is positioned. The image grouping step 303 may, then, form image groups that differentiate images based on the camera pose being substantially horizontal, or substantially facing downwards towards objects on the ground and select appropriate image groups matching the query 406 as the output 407.

Figure 5:
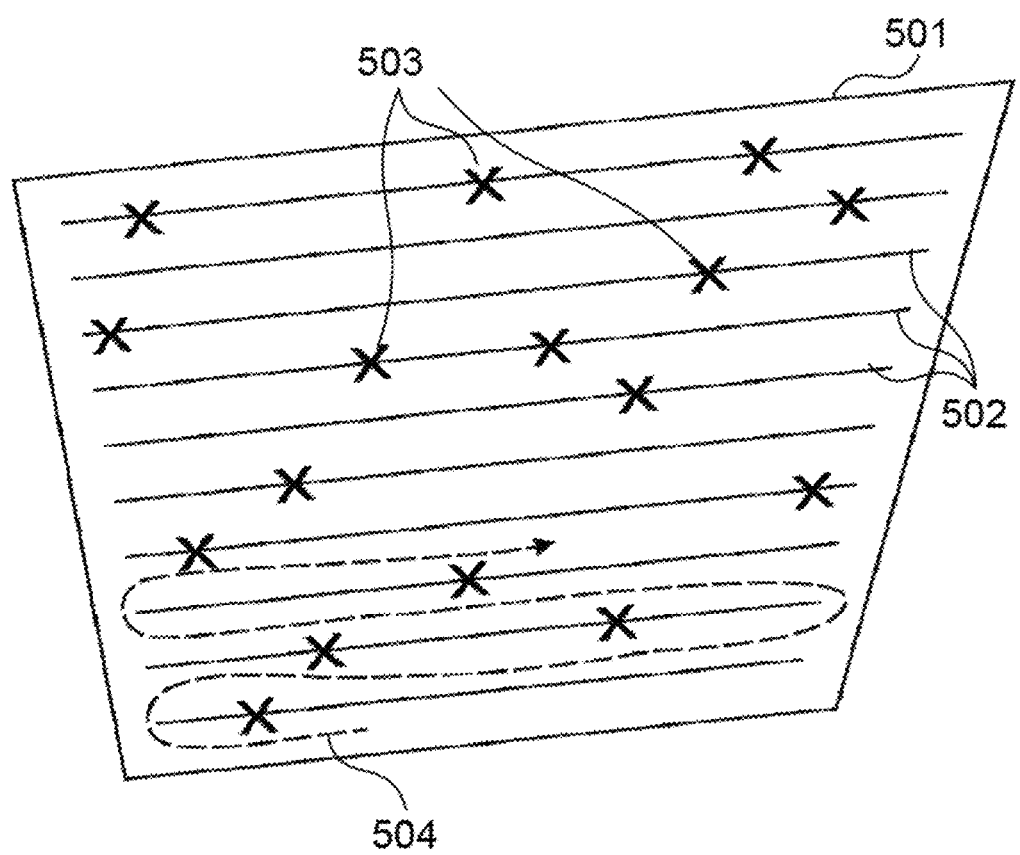
FIG. 5 is an example aerial view of a vineyard in which an embodiment of the invention may be carried out.
Figure 6:
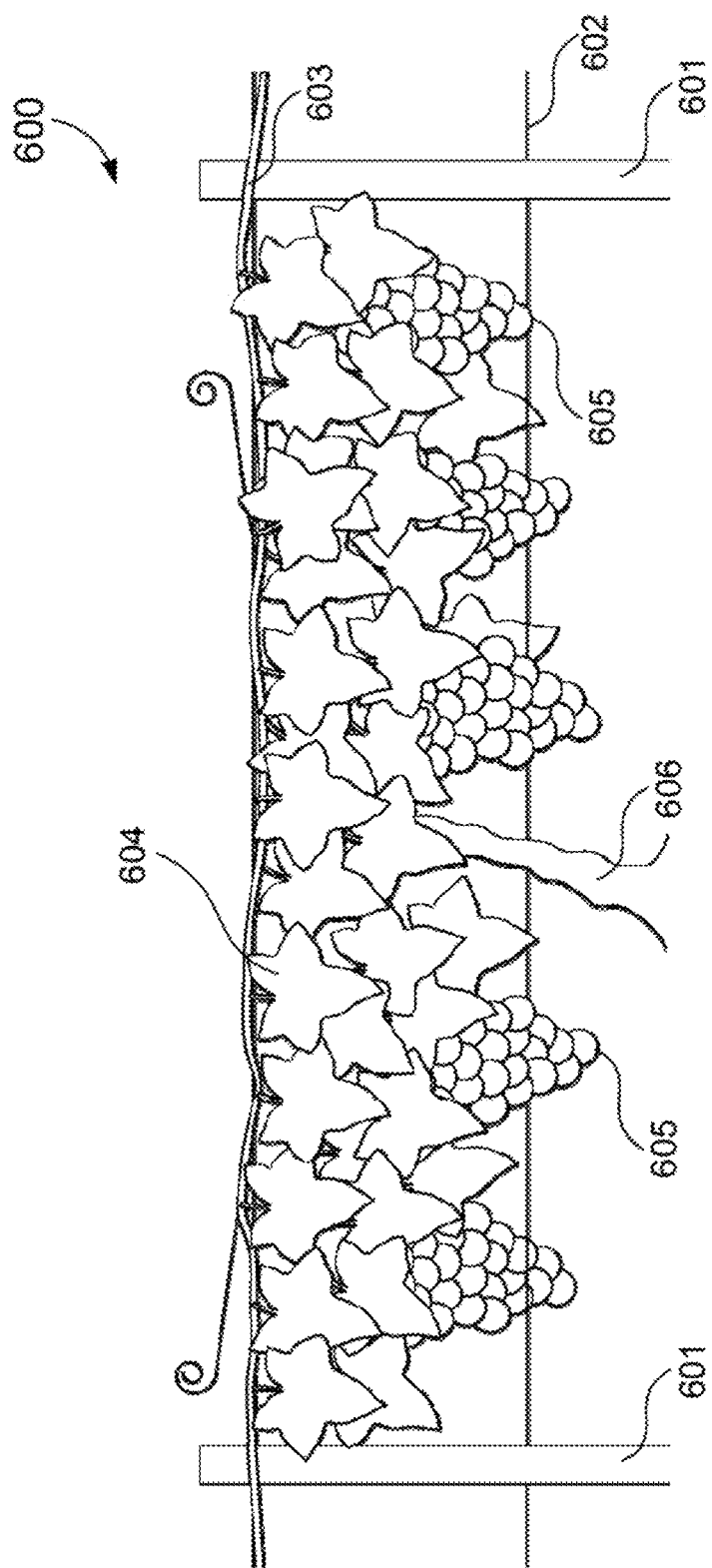
FIG. 6 illustrates a grape vine located in the vineyard of FIG. 5.

The methods described above are now further explained in relation to an example use case in which the asset being managed is a vineyard comprising grape vines. FIG. 6 depicts a single grapevine 600. The grapevine 600 is one of many grapevines growing within a vineyard 501, shown in FIG. 5. FIG. 5 depicts a top-down plan view of the layout of the example vineyard 501. The grapevine 600 is supported on a trellis consisting of vertical posts 601. A similar trellis is provided for each grapevine the vineyard 501. Each of the vertical posts 601 is spaced at regular intervals. A horizontal growing support 602, usually consisting of wires or cables, is affixed to the posts 601. A single continuous trellis is termed a row. A number of rows are depicted in the example vineyard layout 501, such as rows 502. Typically, the rows are arranged in parallel layout with regular spacing to occupy the available space of the vineyard 501.

At each vine 600 location, the vine consists of a trunk 606 extending from the ground, and canes 603 growing from cordons that extend in both directions from the trunk 606 supported by the horizontal trellis supports 602. The canopy of the vine 600 consists of leaves 604 growing on the vine 600 and the corresponding canes 603. When the vine is mature for harvesting of the grapes, the canopy occupies a volume—the canes 603 of the vine grow in different locations, depths and directions generally following but extending away from the trellis supports 602. Grape bunches 605 are located within, and generally extending below the canopy.

Managing the vineyard 501 as an asset involves several data and image collection tasks that occur throughout the growing season. The vines are pruned back to just the main canes growing directly on the trellis before the growing season begins. In the early stages of vine development, one asset management task is to assess the number of fruiting nodes present on the vines. The fruiting nodes each develop into a grape bunch 605 as the growing season continues. Accurate collection of node density early in the growing season allows the asset manager to effectively predict the total amount of fruit that will be harvested, allowing efficient forward planning of acquisition of resources such as workers for harvesting the grapes, water for irrigation, pesticides, fertilizers and the like.

In one arrangement, the methods described are utilised during a data collection task for counting fruiting nodes on the grapevines. The data collection task is carried out by a number of vineyard workers, each carrying a camera (image capture device). Each worker performs a data collection task in which the rows of the vineyard 501 are traversed in a boustrophedon pattern 504 (FIG. 5) up and down each row in alternate direction. The traversal pattern 504 visits predetermined sampling location, such as sampling locations 503. At each of the sampling locations, the worker inspects the vine and counts and records the number of growing nodes on the vine at that location, and then captures a photograph of the vine and developing canes at that location. The manner of counting and recording the number of nodes may be achieved by the camera or other devices having such feature therein.

During the data collection task described above, a relatively large number of images are collectively captured by the vineyard workers performing the data collection. In a typical asset management workflow, the large set of images is accumulated into a central image store 405 for storage and subsequent recall. During the process of carrying out the image acquisition, workers may be instructed to additionally record images depicting incidental issues encountered in the vineyard, even between the predetermined sampling sites 503—for example, recording a broken support post or trellis element. Then, when performing an asset management task for the vineyard, the vineyard manager may form the query 406 to relate to images captured as vine images at sampling locations (and associated with node count data), but ignoring other images incidentally acquired by the workers.

In the example image collection task described herein, workers walk between the predetermined sampling locations 503, during which a recorded inertial profile exhibits characteristics such as periods of high energy movement (as for period 804), or unstable gyroscopic pose (as for period 904). When a worker reaches each sampling location 503, a pause occurs while the worker performs the vine observation and count nodes. The inertial profile corresponding to the observation and count phase of the task is characterised by the image capture moment occurring during, or shortly after the end of periods of low energy movement (as for period 805). Incidental image captures may also occur during the period in which the vineyard worker is walking between sampling sites, observing an unusual condition and immediately captures an image without the characteristic low-energy pause period during which node counting usually occurs. The pre-determined time period before and after image capture depends on the task performed. For example, the duration of the task for counting fruiting nodes may be approximately 1 minute for the average worker at a sample site, before the worker travels to the next sampling location. Therefore, the pre-determined time period used in determining step 302 for collecting inertial profile based on sensors may be two minutes before and after the capture time for an image. The time period is chosen to capture the inertial profile of the worker while he or she is performing the fruit node counting task. Other time periods may be chosen, such as one minute or three minutes, or even longer. However, time periods shorter than one minute will not guarantee that all inertial profile data related to the fruit node counting task will be captured, therefore time periods shorter than one minute will not be chosen as the pre-determined time period in step 302.

Not all counting tasks will use the same pre-determined time period for determining inertial profiles for an image. Whilst the duration for a fruit node counting task is approximately one (1) minute, other counting tasks may take significantly longer due to the nature of the asset being examined, or the state of the asset being examined, or characteristic of the item being counted. For example, counting grape inflorescences (flower clusters) in grape vines with a vigorous canopy can take significantly longer due to the worker taking longer to locate each inflorescence. In general, the pre-determined time period for determining an inertial profile needs take into account the duration of the task being performed. Therefore, the range of pre-determined time period may vary from seconds to hours, and determined by experimentation or measurement of worker times.

Additionally, incidental images may be differentiated from the captured images as not occurring following periods of low energy movement, and by the presence of consistent gyroscopic data indicating a period of stable azimuth angle camera pose aimed substantially towards an image subject located on the ground. Therefore, in the image grouping step 303, an image group with label "node count survey" may be formed for images associated with the primary task of counting nodes for sampling sites and recording the vine appearance at those locations, and another image group with label "incidental" may be formed for incidental images. Therefore, when reviewing images relating to a query for a node counting task, incidental images are not included in the set of images displayed to the vineyard manager during the task of inspecting the resulting image set.

In another arrangement, the image capture devices 401 may be configured to allow the worker to record additional metadata with the captured photograph when the shutter button is clicked. Accordingly, the images may further be grouped based on interaction of the user with one or more camera shutter buttons. Additional metadata includes the type of image-subject being captured, such as a "canopy" type for canopy photographs associated with a node counting task at sampling locations 503, or incidental images captured between sampling locations. Additional metadata can also include task-specific properties that can be a counter for counting tasks such as the aforementioned number of growing nodes on the vine, and a rating number or grade for rating tasks. In yet other arrangements, the additional metadata may only record one out of the image-subject type or task-specific property. The additional metadata may be referred to as a "tag", and the recording thereof as "tagging" or "tag" also. The additional metadata may be manually entered by the worker to the image capture device being used as described in relation to FIGS. 13A and 13B for example.

FIGS. 11A and 11B show schematic flow diagrams of methods 1100 and 1120 for grouping images taken using a camera capable of recoding additional metadata with captured images respectively. Each of the methods 1100 and 1120 are typically implemented as one or more modules of the application 133, stored in the memory 106 and controlled under execution of the processor 105. The method 1200 represents an implementation of the method 300.

The method 1100 begins at receiving step 1101. At step 1101a set of images from which to form image groups is received. Images may, for example, be received at an image data store 405 from one or more image capture devices 401 and subsequently received or identified from the image data store 405 at step 1101. Step 1101 operates in a similar manner to step 301. The method 1100 proceeds from step 1101 to a determining step 1102. At execution of step 1102, additional metadata data recorded with the images is determined. The additional metadata relates to settings of each of the image capture devices, and data entered to the image capture device at the time of image capture. The method 1100 continues from step 1102 to a grouping step 1103. The additional metadata is used in the metadata-based image grouping step 1103. Image groups are formed by execution of step 1103, and images from the set of images received at step 1101 are placed into one or more image groups. The image groups may be optionally labelled with unique label names corresponding to the metadata used to group the images, such as label name "canopy images" for the image group containing images captured with the "canopy" image-subject metadata. The method 1100 ends after carrying out step 1103.

Alternatively, FIG. 11B describes a method 1120. In execution of the method 1120, images are grouped by both the associated inertial profile and additional metadata. The method 1120 begins at step 1121, at which a set of images from which to form image groups is received. The step 1121 operates in a similar manner to step 1101 of FIG. 11A. The method 1120 proceeds from step 1121 to a determining step 1122. In step 1122, additional metadata data recorded with the images (for example setting of the image capture devices 401) and an inertial profile for each of the image capture devices is determined. Step 1122 relates to an implementation of step 302. The method 1120 proceeds from step 1122 to a grouping step 1123. Step 1123 relates to step 303 of FIG. 3. Both the additional metadata and inertial profile are used in the metadata- and inertial profile-based image grouping step 1123. Image groups are formed by execution of step 1123, and images from the set of images received at step 1101 are place into one or more image groups. The metadata and inertial profile grouping step 1123 may group images first by inertial profile and then further group by additional metadata associated with captured photographs, or group first by additional metadata associated with captured photographs and then further group by inertial profile. The method 1120 ends after executing step 1123.

Figure 13A:
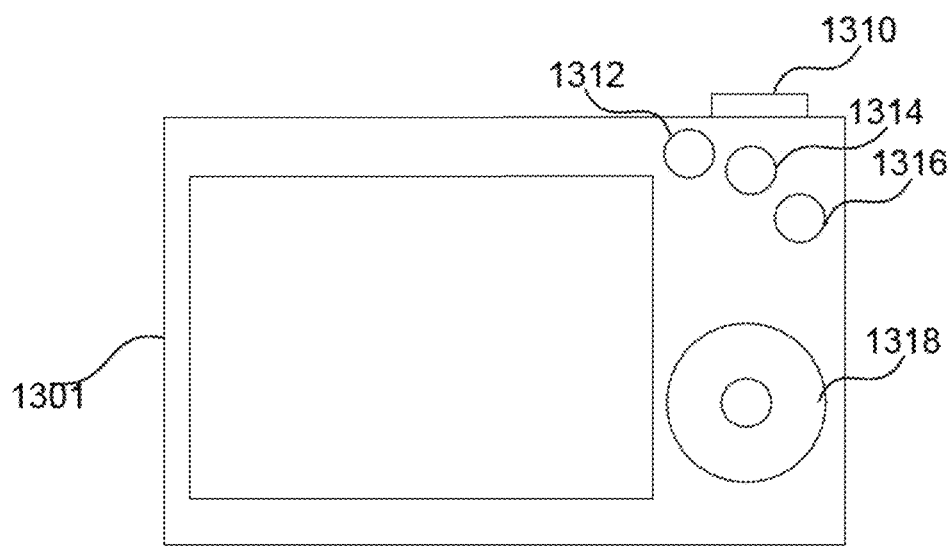
FIGS. 13A and 13B illustrates example camera devices used to capture images for use with the method of grouping images.
Figure 13B:
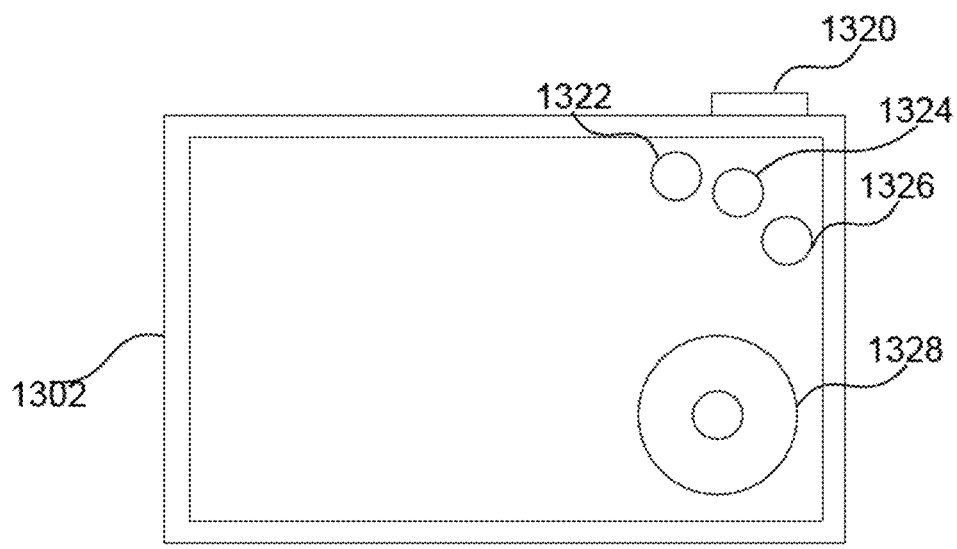

FIGS. 13A and 13B depict examples of interfaces of camera devices that can be used to enter additional metadata with the captured photograph. The additional metadata may be stored in a captured image's Exif (exchangeable image file format) metadata, in a separate file on the capture device's file system, as a modification to the captured image's filename, as modification of the captured image's content, or other means known for storing or relaying additional metadata to be associated with a photograph or captured image. The acceleration data may be stored in a similar manner, for example in a separate file. A user may enter the additional metadata using a user interface on the camera. The user interface may be dedicated hardware buttons or software buttons on the device screen, or a gesture detectable by the capture device such as tapping, noise, movement, or a voice assistant on the device.

FIG. 13A depicts an example rear view of a camera device 1301 with a primary shutter button 1310, and additional shutter buttons 1312, 1314 and 1316. Each of the shutter buttons 1310, 1312, 1314 and 1316 will simultaneously tag and capture a photograph when pressed. The shutter buttons 1310, 1312, 1314 and 1316 are configurable such that each shutter button may record a different image-subject type in the tag when capturing an image.

A user will typically use the primary shutter button 1310 for capturing images at the sampling locations 503 for a data collection task, and use the additional shutter buttons 1312-16 are used to capture incidental images (photographs). Each shutter button tags a different image type and also captures a photograph in a single click. For example, the data collection task in bridge scour analysis requires bottom sampling and river bed surveys around bridge structures such that each bridge pier and pylon is designated as a sampling location. A user will use the primary shutter button 1310 to capture images for each sampling location. While performing inspection, the user may also identify debris build-up at locations other than the designated sampling locations. For example, the additional shutter button 1312 can be used to capture an image and tag an image-subject type of "Debris". Likewise, the user may identify other incidental issues such as road surface damage on the bridge, graffiti on the bridge, electrical issues such as broken lights, or other miscellaneous issue. Therefore, the shutter button 1314 can be configured to capture an image and tag an image-subject type of "Graffiti". As there is only one (1) more shutter button 1316 on device 1301, images captured by the 1316 shutter button will tag an image-subject type of "other incidental issues". Alternatively, the tag added using a shutter button at time of capture can relate to a particular task, such as counting vines, identifying disease on vines or the like.

Additional buttons on the camera device 1301 allows the user to enter task-specific properties. A clickable scroll wheel 1318 combines a scroll wheel and four or eight-way directional control pad (D-pad) into a single physical interface. The scroll wheel or control pad 1318 can be used to enter task-specific properties such as the estimated scour depth in the case of bridge scour surveys, the counted number of growing nodes on a vine in a vineyard yield survey, or the size of graffiti identified during bridge scour surveys. A tag relates to camera settings stored as metadata stored in each image. Accordingly, grouping can be further based on the tag.

FIG. 13B shows an example rear view of a camera device 1302. The camera device 1302 includes a mix of hardware and software buttons. A primary shutter button 1320 is a physical hardware button and other shutter buttons 1322, 1324 and 1326 are software buttons, along with a virtual D-pad (control pad) button 1328. The software buttons 1322, 1324, 1326 and 1328 on the camera device 1302 are functionally identical to the corresponding hardware buttons 1312, 1314, 1316 and 1318 on the camera device 1301. In yet other example, all buttons may be software buttons for a camera device, as is common in mobile computing devices.

Figure 10:
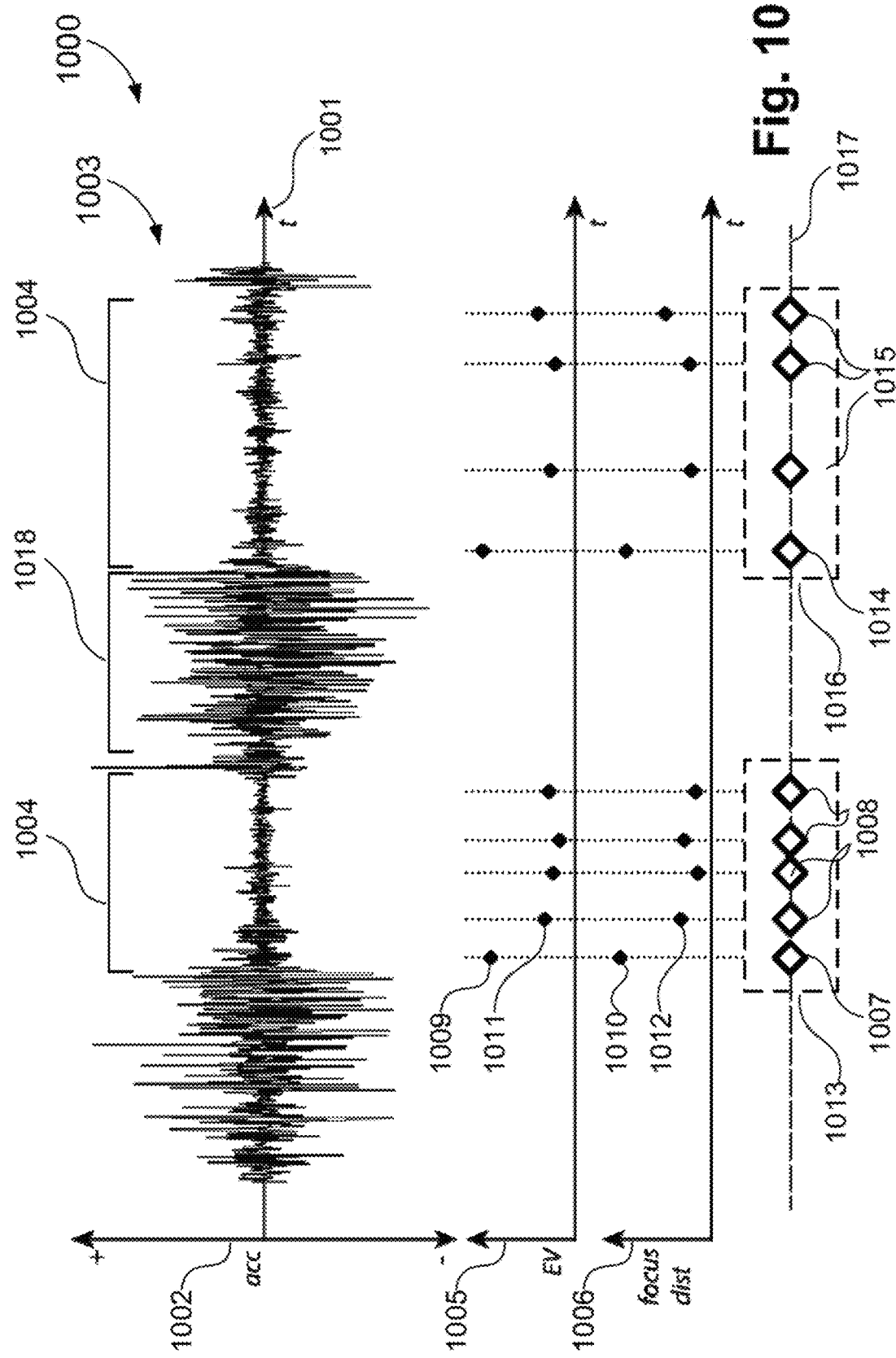

In a further arrangement, camera settings including light exposure level, and maximum focus distance are used in conjunction with the inertial profile in order to group images. FIG. 10 illustrates a set of results 1000 for an example sequence of captured images, with an acceleration-based inertial profile representing movement energy, and associated camera settings for each capture. Similarly to FIGS. 8 and 9, an inertial profile 1003 is shown on a graph with a horizontal axis 1001 representing time, and a vertical axis 1002 representing data collected from an accelerometer sensor in the camera. The inertial profile 1003 has several periods of low movement energy 1004, amongst other periods of higher movement energy 1018. The inertial profile 1003 is generated by execution of step 302 or 1122 for example.

A corresponding further graph 1005 indicates a first camera setting reading for each captured image. The first camera setting reading is a light exposure level for the corresponding image. In a typical automatic mode of operation, a camera (image capture device) monitors or samples the amount of light incident on the image-capture sensor, and automatically adjusts the aperture or shutter time camera settings in order to record an image with a normalised overall exposure to light on the sensor. From the aperture or shutter time settings, an exposure value can be derived, indicating the general brightness (or total amount of incident light) of the real-world scene that was captured, as viewed by the image capture sensor via the camera lens.

A corresponding further graph 1006 indicates a second camera setting reading for each captured image. The second camera setting reading is a maximum focus distance for the image. During image capture, a camera typically utilises one or more autofocus points to perform focusing. Each autofocus point records a distance (in the captured scene) to a point in focus, if any. From the focusing data, a maximum focus distance can be derived, indicating the distance to one or more objects depicted in the captured scene. In some arrangements, an amount of zoom currently utilised by the attached lens may affect this calculation and the resulting derivation of maximum focus distance.

In the example arrangement of FIG. 10, during execution the image grouping step 303, for a period of low energy movement 1004, a first image captured at time 1007 and subsequent images captured at times 1008 (belonging to a single low energy movement period according to the inertial profile) are formed into a first image group 1013 at step 303. A second image group 1016 is formed for a first image captured at a time 1014 and subsequent images captured at times 1015 (belonging to a single low energy movement period according to the inertial profile).

Furthermore, within each image group 1013 or 1016 of the example of FIG. 10, image captures are further grouped, (or categorised, tagged, keyworded or the like) on the basis of the associated camera settings data associated with each capture. In the example of FIG. 10, the image captured at time 1007 is designated within group 1013 at step 303 as having an exposure value, and/or maximum focus distance value substantially higher than that of other images captured within group 1013. Similarly, the image captured at time 1014 is differentiated from other images captured in group 1016. In some arrangements, a further image group may be formed containing images captured at 1007 and 1014 at step 303.

The arrangements described above are now further described within the context of an image data collection task as part of managing a vineyard asset 501. At a further time period during development of the vine 600, at the point where grape bunches 605 are developing but not yet ready for harvest, one vineyard management task is to assess the developing grape bunches 605 for incidence of disease and pests that may potentially decrease the expected crop yield. As for the previous vineyard management example, the vineyard workers collectively traverse the rows 502 of the vineyard 501 in order to visit pre-determined sampling sites 503. At each visited sampling site, the work task involves capturing a canopy image showing the appearing of the vines at that site, and additionally, capturing images of one or more grape bunches 605 growing on the vine at that site. As the growth habit of the vine plants typically results in the grape bunches 605 appearing within and below the canopy formed by the vine leaves 604, the grape bunches 605 are often shaded by the leaves 604 in such captured images, and therefore they have lower exposure value readings in the associated camera settings data. Additionally, in order to record an image of each grape bunch 605, the camera needs to be placed in close proximity to the grape bunch 605 such that the grape bunch fills the available frame of the captured image.

Figure 7A:
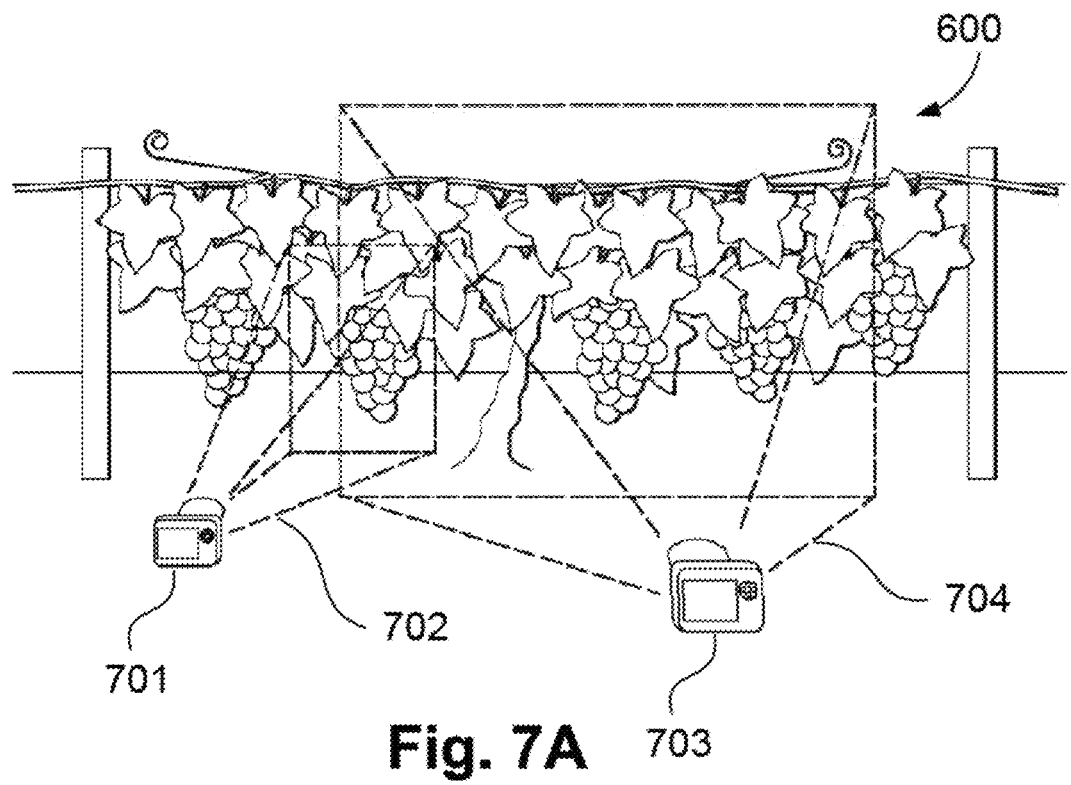
FIG. 7A-7C illustrates an example inertial profile based on accelerometer data.
Figure 7B:
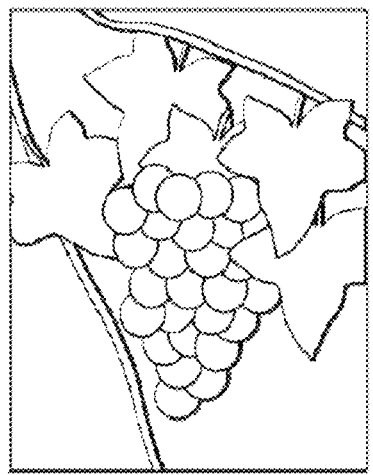
Figure 7C:
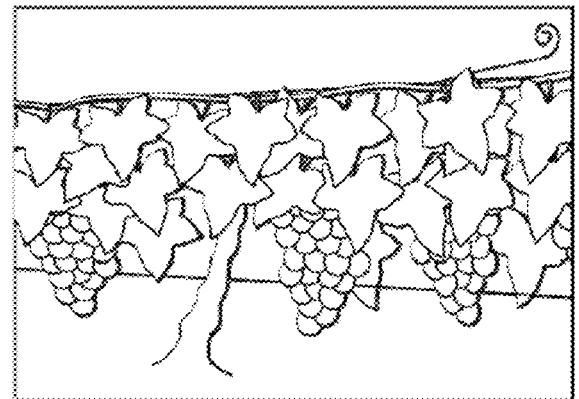

FIG. 7A shows the example grape vine 600 of FIG. 6, with a first camera position 701 with close-up view 702 of a grape bunch within the vine canopy, and a second camera position 703 with a wide view 704 of the vine canopy. FIG. 7B shows an example image 705 illustrative of grape bunch images captured using the position 701 and the view 702 during the vineyard management workflow example. FIG. 7C shows an example image 706 illustrative of vine canopy images using the position 703 and the view 704 during the vineyard management workflow example.

As the vineyard workers performing the image data collection activity capture images at the necessary sampling sites, the workers may additionally annotate grape bunch images with observation data including the presence or intensity of disease or pests affecting a grape bunch.

As applied to this image data collection activity, during image group-forming step 303, image groups are formed for each visited sampling site. During periods in which a vineyard worker is walking from one site to another, the inertial profile exhibits periods of high energy movement, as recorded by accelerometer sensor data in the camera. An image group consisting of a sequence of image captures corresponding to a single period of low energy movement (in between other periods of high energy movement) is indicative of a task of observing, assessing and capturing images of grape bunches. Images captures corresponding to a single sample site are grouped together in a first group, distinct from other such image groups corresponding to other visited sampling sites.

Further image grouping is performed on the basis of camera setting data associated with images of the captured image sequence. Vine images can be differentiated from bunch images by means of both exposure value camera settings data, and maximum focus distance camera settings data. The vine images can be differentiated by means of exposure value settings and maximum focal distance settings because bunch images tend to be of the typically more shaded areas on the vine, in the underparts of the canopy, and require the vineyard worker to position the camera close to the desired subject, In contrast, canopy images tend to include brighter illumination from the general ambient light (including bright sunlight) of the scene, and require the vineyard worker to position the camera further away from the desired subject. During the image group-forming step 303, image groups can be created based on the types of activity present in this particular image collection task (canopy images, and bunch images), and images assigned into the appropriate groups.

When performing an asset management task relating to the example image data collection task, the vineyard manager may, for example, form a query 406 relating to image data collected at individual sampling sites within the vineyard 501. By virtue of the grouping imposed on the images stored in the image data store 405, the group result 407 determined at step 303 is provided with much greater utility than would be the case if the images were examined in bulk without differentiation into groups. In further examples, the vineyard manager may form queries that provide image groups corresponding to types of image captures (canopy, bunch, or incidental), or according to other annotations such as presence of disease or pests.

Although omitted from the description of this workflow example, the current arrangements can be practiced in combination with the previous example in which incidental images are further differentiated based on an inertial profile that incorporates other types of data such as data added through manipulation of shutter buttons in FIG. 13A or 13B, or camera settings.

In another arrangement, further image grouping is performed at step 303 on the basis of inertial profile data but using different criteria to the sorting criteria described above. In the current example of grape disease and pest incidence survey task of a vineyard, instead of (or in addition to) further grouping an image group from one sample site using camera setting data at step 303, the inertial profile for each image in the image group is examined at step 303 to determine or identify a pattern of inertial profiles. The images can be further grouped based on the identified pattern. In the vineyard example, the assessment time for a diseased grape bunch is typically significantly longer than a non-diseased grape bunch due to the need to rate the level of disease severity for a diseased grape bunch.

Thus, the frequency of capture using the camera shutter buttons (as described at FIGS. 13A and 13B) can be used to group grape bunch images into diseased and non-diseased groups. Alternatively, the length of time between shutter button presses (for example predetermined length of time before and after image capture) within the pre-determined time period of the inertial profile can be used to group grape bunch images into diseased and non-diseased groups. The output group 407 may relate to a query searching for images likely to relate to diseased vines for example. Images in the incidental image group may also be further grouped based on identifying patterns in the inertial profiles associated with the images.

In the vineyard example, images of insects require careful framing in order to properly capture details of the insect, whereas images of a broken support post can be taken quickly due the large size of the photographed subject. Therefore, the inertial profile for images of insects can be associated with a short period of very low energy movement just prior to capture when the worker is carefully framing the insect. The period is typically relatively shorter than the pause associated with sample sites and the magnitude of energy movement much smaller than those of grape bunch images. In contrast, the inertial profile for images of broken support posts will not have the pattern of short period of very low energy movement just prior to image capture. Therefore, the incidental image group can be further grouped at step 303 based on identifying patterns in the inertial profiles of the images.

Accordingly, image groups can be formed further based on a frequency of interaction of a user of the image capture device with one or more shutter buttons of the image capture device, or based on identifying a pattern of inertial profiles for images within each of the groups. Each of the frequency of interaction with the shutter buttons and the patterns can be determined based on the particular tasks to which the images relate, such as the vineyard example.

In each of the above arrangements and example use cases for performing asset management, the described methods operate in the image-forming step 303 by utilising known conditions and work tasks that shall be performed during the image data capture process. That is, forming image groups based on a current workflow task (or step within a workflow) relies on predetermined knowledge of the types of tasks carried out during image data collection and associating the groups of images with the relevant tasks. The set of relevant tasks is pre-determined. Interpreting the inertial profile information for the captured image sequence then relies upon correlating differentiable periods of the inertial profile with conditions encountered during the carrying out of the tasks. As an example of using inertial profile, as described above, it is known during a node counting workflow in a vineyard that a pause occurs during the node counting at a sampling site. Therefore, the task of node sampling can be distinguished from other pre-determined tasks based on an inertial profile that records or derives total movement energy from the sensor data of the camera, and grouping or sorting images can be further based on distinguishing the task.

Furthermore, forming image groups in step 303 is dependent on an imaging entity deployed during the image data collection task. An "imaging entity" refers to a complete system for performing image data capture. An imaging entity typically comprises at least an image capture device or camera. An imaging entity can also comprise at least one of a vehicle or device upon which the image capture device is mounted and a user operating the image capture device. An imaging entity may be differentiated from another by the model of camera (image capture device) being utilised, due to aspects such as the size or weight of the camera. Differentiation may occur by whether the camera is handheld or mounted to a vehicle, or by the manner in which the camera is mounted or held, such as using a gimbal, a monopod, or a "selfie stick" or similar apparatus.

During the image group-forming step 303, known aspects of the imaging entity are utilised in order to determine how to interpret the inertial profile in order to yield ways of segmenting the inertial profile data into time regions that represent the various known tasks within the image data collection workflow.

For example, one imaging entity may be characterised as being a camera mounted on a quad-bike. the quad-bike is driven to various sites in the asset being managed for the image data collection workflow. In the scenario of a camera mounted on a quad-bike, characteristics of the inertial profile for segments of the task workflow are different than described above for node counting example, in which the camera was handheld by a worker. For example, tasks in the image data collection workflow during which the worker brings the quad-bike to a halt and pauses while the worker carries out an inspection activity may be characterised by an inertial profile segment showing that the camera is almost completely stationary, but subject to characteristics of vehicle, such as vibrations introduced by the idling speed of the motor of the vehicle. A camera carrying out an implementation of the methods described would therefore use a modified method in step 303 for forming image groups based on an inertial profile with an imaging entity being a vehicle-mounted camera, versus the case where the imaging entity is a human operator carrying the camera by hand.

Further distinguishing characteristics of an inertial profile can be identified for cases in which the imaging entity is, for example, one of a drone-mounted camera, a heavy camera with human operator, a camera worn on the person using a head-mount or body-mount, a camera carried by means of a gimbal or "selfie stick". In such variations, the further distinguishing characteristics of an inertial profile may be related to the type of sensor data appropriate for forming a distinguishable inertial profile, or may be related to the characteristics of the recorded sensor signal itself. Characteristics of the recorded sensor signal may include one or more factors such as a signal magnitude, a frequency characteristic, a stability characteristic, a time period length characteristic, and a speed of movement characteristic. In some implementations, acceleration data may relate to the image capture device alone or to the image capture device and the imaging entity. For example, an acceleration sensor such as an accelerometer may be attached or applied to a hand of a person operating the image capture device as well as the image capture device. In such instances, the acceleration of the hand operating the image capture device may also be used in determining the inertial profile.

In some arrangements, the methods described can be applied to an asset management task involving a heterogeneous set of imaging entities working together, or in distributed fashion, to perform the image data collection across the entire site of an asset. Alternatively, the image data collection may occur over an extended time period with different conditions or equipment. Factors that can affect characteristics of the recorded sensor signal can include human factors, device specification, device ergonomic factors, weather conditions, time of the day, and the like. For example, two different users may carry a camera differently when travelling between sampling sites, and hold the camera differently at a sampling site, thus the inertial profiles from the two different users for the same task may differ in parameters such as magnitude, duration, rate of change, or direction of change in the recorded accelerometer data. Another example may relate to two different cameras with differing lens focal lengths which dictate user movement and camera position when taking a photograph. In a further example, ergonomic factors of the camera device such as differences in the size and weight between the compact digital camera 403 and the interchangeable-lens digital cameras 404 can significantly affect the amount of gross versus fine motor movement involved in operating the camera by a user, and therefore affect the accelerometer data recorded by the camera.

Figures 12A, 12B:
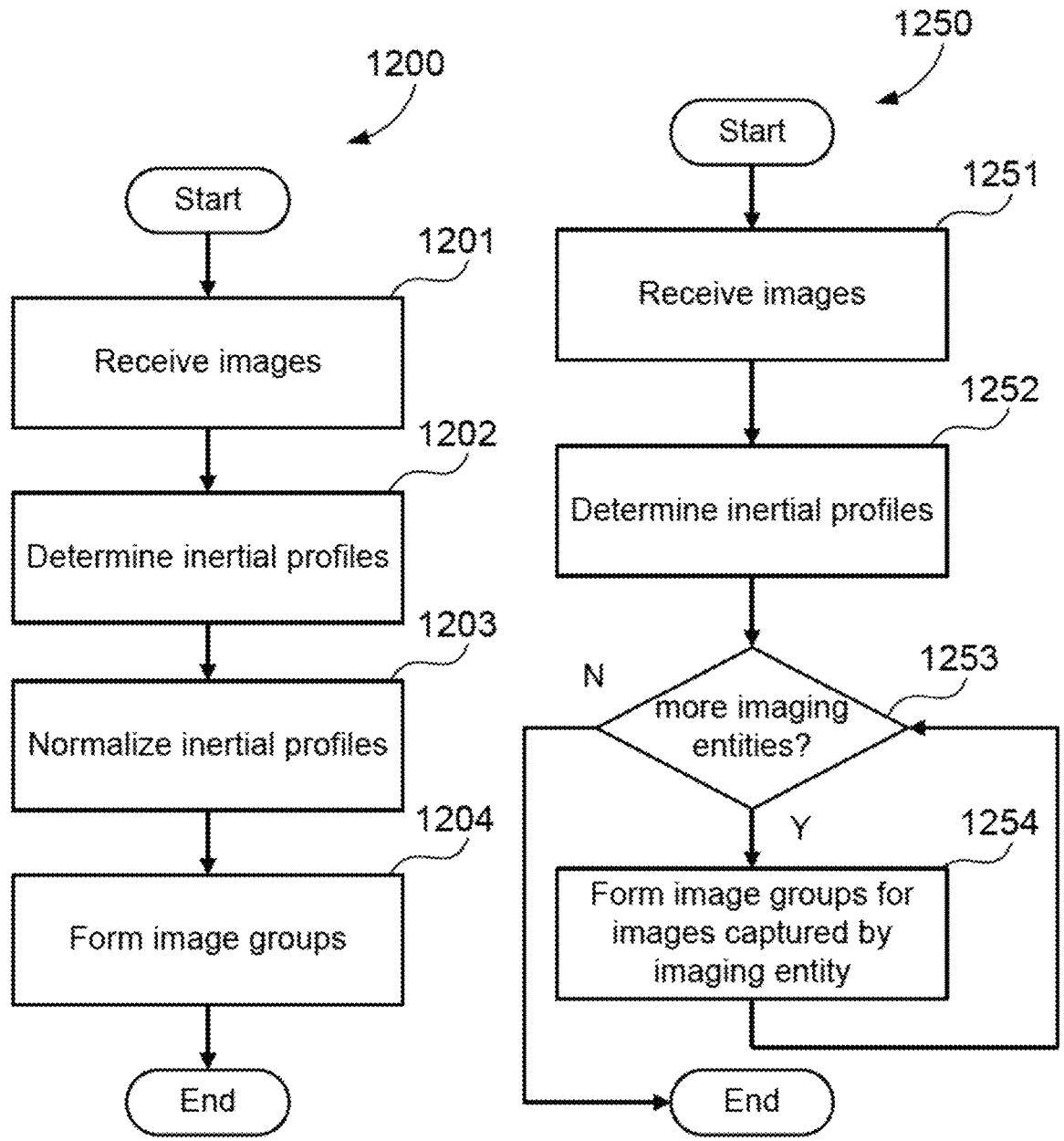
FIGS. 12A and 12B show schematic flow diagrams of methods of grouping images via motion patterns in a heterogeneous set of cameras.

In a heterogeneous image entity environment, inertial profiles based on one imaging entity may not effectively group images captured by another image entity. FIGS. 12A and 12 B depict schematic flow diagrams for two different methods 1200 and 1250 respectively. The methods 1200 and 1250 operate to group images taken using a heterogeneous set of cameras using motion patterns. The methods 1200 and 1250 are each typically implemented as one or more modules of the application 133, stored in the memory 106 and controlled under execution of the processor 105. The methods 1200 and 1250 relate to implementations of the method 300.

The method 1200 begins at receiving step 1201. At step 1201, a set of images from which to form image groups is received or located. Images may, for example, be received at an image data store 405 from one or more image capture devices 401. Each image in the received image set has associated camera settings and camera user settings. In some arrangements, data relating to the camera settings and camera user settings is stored within each image as metadata. The camera settings data may include one or more of exposure or brightness values, and focus depth data at one or more autofocus sensor positions within an image. Each image has an associated image capture time. The camera user settings typically uniquely identify the user of an image capture device, so that the combination of the image capture device and camera user setting can uniquely identify an imaging entity. The camera settings and camera user settings will typically vary based upon the camera type, the user operating the camera, tasks, environmental conditions and the like.

The method 1200 proceeds from step 1201 to a determining step 1202. At step 1202, an inertial profile for the received images is determined. The inertial profile is based on acceleration data collected by one or more sensors in each camera. In some arrangements, acceleration data is continuously sampled during operation of each camera. In arrangements continuously sampling acceleration data, for the duration of a sequence of camera operation in which one or more images are captured, the sampled acceleration data is stored as a time sequence and associated with those image captures. In some arrangements the associated image capture time for each image is relative to the start time of the acceleration data sequence. In yet other arrangements, the time of the beginning of the acceleration data sequence and the image capture time for each image are all with respect to a global clock, and the relative times can therefore be derived.

Acceleration data is sampled from one or more sensors in each camera, and may be directly measured or derived values that store the movement, rate of change of movement, and pose or orientation of the camera. For each image, an inertial profile is determined based on data from such sensors collected over a time period spanning a pre-determined range before and after the capture time for that image.

The inertial profile determined at step 1202 also depends on the imaging entity participating in the image capture operation. In the example of FIG. 12A, the imaging entity may vary based on aspects of a known profile of a particular camera, such as camera size and weight, form factor, and the manner that the camera is held whilst in use. One imaging entity may also be differentiated from another depending on whether the camera is being used by a human operator directly, or is mounted on a tractor, drone or other vehicle.

The method 1200 proceeds from step 1202 to an inertial profile normalization step 1203. In step 1203 a device-independent inertial profile is constructed from the inertial profile determined at step 1202 for each image using profile-independent features such as relative acceleration, relative speed of movement, and relative time period length of movement. For example, a common acceleration profile normalization method combines three acceleration axis readings (X, Y, Z) from a tri-axial accelerometer into a single vector, the resultant vector calculated using Equation (1).

$$\text{resultant vector} = \sqrt{X^2 + Y^2 + Z^2} \quad \text{Equation (1)}$$

The resultant vector is a measure of magnitude of acceleration force while the user is holding an imaging device regardless of which direction the imaging device is being held, thus eliminating differences in the way different imaging entities hold or carry cameras whilst carrying out an asset inspection process. Another example method for normalization operates to normalize the effect of the weight of imaging devices on inertial profiles captured by devices. It is known that given the same force, objects with smaller mass will experience higher levels of acceleration, while objects with larger mass will experience lower levels of acceleration. As such, larger and heavier imaging devices tend to record lower magnitude of acceleration compared to smaller and lighter imaging devices. In order to normalize the effects of weight, a series of accelerometer readings from a device is normalized by dividing the accelerometer readings by the maximum magnitude from that series of readings, such that after normalization, a reading of 1.0 represents maximum acceleration experienced by the device, regardless of the weight of the device. Other normalization techniques known for normalizing inertial profiles such as feature scaling and quantile normalization can also be applied in the inertial profile normalization step 1203.

Implementation of the normalization step 1203 for a given task allows variation in inertial profiles due to different users, imaging entities, camera weights and the like to be ameliorated. Accordingly, images for the same task may be grouped appropriately irrespective of the variations in profile between different image capture devices.

The method 1200 proceeds from step 1203 to a grouping step 1204. In step 1204, image groups are formed, and images from the set of images received at step 1201 are placed into one or more image groups. The method 1200 ends after carrying out step 1204.

The method 1250 of grouping images using device-dependent inertial profiles is shown in FIG. 12B. The method 1250 begins at receiving step 1251, at which a set of images from which to form image groups is received or located. Images may, for example, be received at an image data store 405 from one or more image capture devices 401. Each image in the received set has associated camera settings and camera user settings. In some arrangements, data relating to the camera settings is stored within each image as metadata. The camera settings data may include one or more of exposure or brightness values, and focus depth data at one or more autofocus sensor positions within an image. Each image has an associated image capture time.

The method 1250 advances from step 1251 to a determining step 1252. At step 1252 an inertial profile for the images is determined. The inertial profile is based on acceleration data collected by one or more sensors in the particular camera that captured the image. In some arrangements, acceleration data is continuously sampled during operation of the camera. In arrangements in which acceleration data is continuously sampled, for the duration of a sequence of camera operation in which one or more images are captured, sampled acceleration data is stored as a time sequence and associated with those image captures. In some arrangements the associated image capture time for each image is relative to the start time of the acceleration data sequence. Alternatively, in other arrangements, the time of the beginning of the acceleration data sequence and the image capture time for each image are all with respect to a global clock, and the relative times can therefore be derived.

Acceleration data is sampled from one or more sensors in the camera, and may be directly measured or derived values that store the movement, rate of change of movement, and pose or orientation of the camera. For each image, an inertial profile is determined based on data from the acceleration sensors collected over a time period spanning a pre-determined range before and after the capture time for that image. If the acceleration data includes orientation information, the inertial profile includes an orientation component relating to an orientation of the camera.

The inertial profile determined at step 1252 also depends on the imaging entity participating in the image capture operation. In arrangement of FIG. 12B, the imaging entity may vary based on aspects of a known profile of a camera, such as camera size and weight, form factor, and the manner that the camera is held whilst in use. One imaging entity may also be differentiated from another depending on whether the camera is being used by a human operator directly, or is mounted on a tractor, drone or other vehicle.

The method 1250 proceeds from step 1252 to an entity check step 1253. Operation of step 1253 checks if there are any more imaging entities to be processed. If there are still more imaging entities to be processed ("Y" at step 1253), the method 1250 proceeds to an entity-specific image grouping step 1254. The step 1254 is executed to form image groups using entity-specific inertial profile features and parameters, and images captured by the imaging entity from the set of images received at step 1251 are placed into one or more image groups. The entity-specific features and parameters may differ in patterns of user movement, magnitude of inertial profile data, and the expected duration for a user to perform a data collection task. Accordingly, images from the store 405 corresponding to a given task can be grouped irrespective of the entity that captured the image, or variations in the inertial model associated with different imaging entities. Step 1254 effectively operates to form the image groups based on the imaging entity associated with the determined profile of each image.

When the entity-specific image grouping step 1254 finishes grouping images belonging to the imaging entity, the method 1250 returns to the entity check step 1253. When there are no more imaging entities to be processed at the entity check step 1253 ("N" at step 1253), the method 1250 ends.

Figure 14:
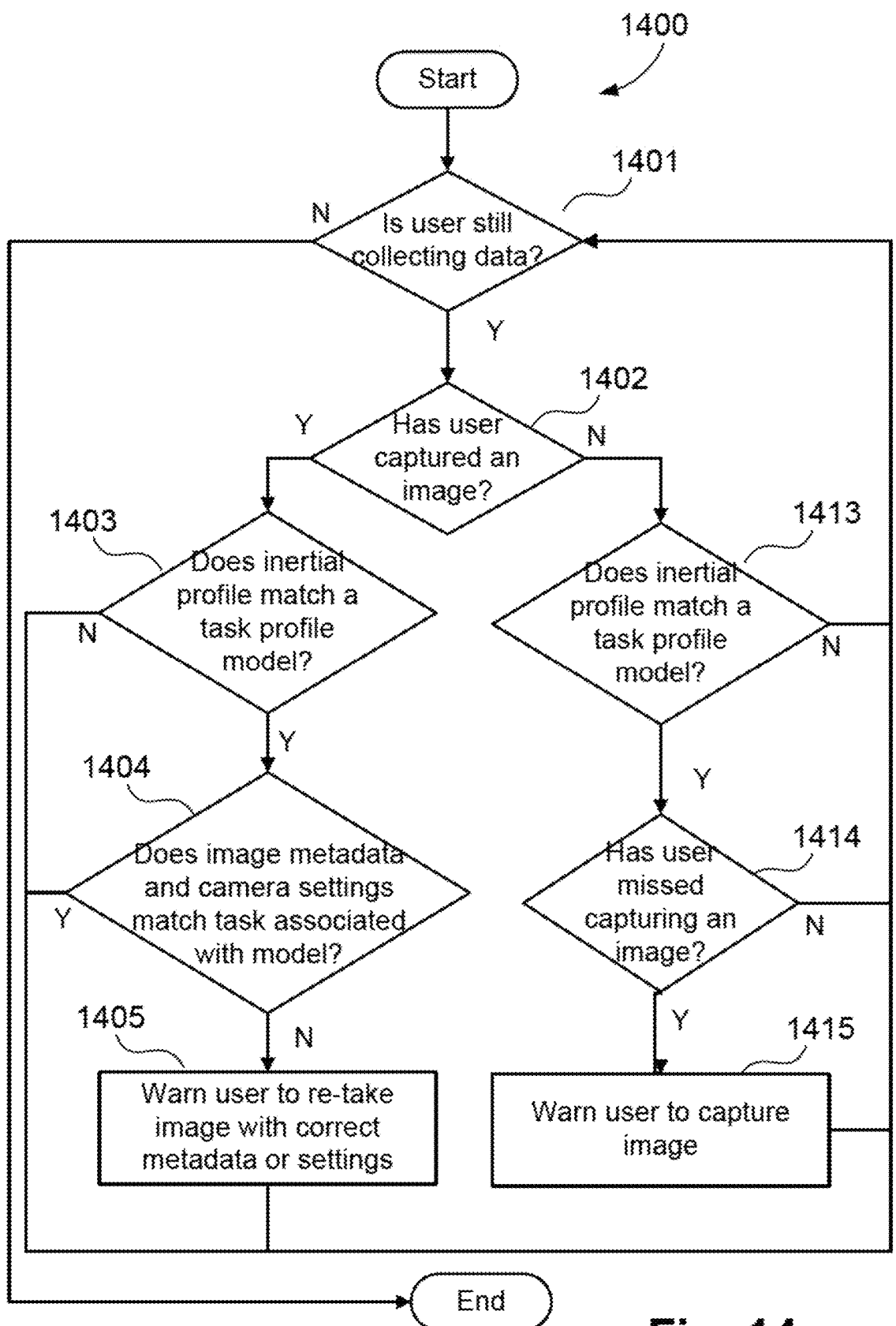
FIG. 14 is a schematic flow diagram illustrating a method of warning users of user errors during the data collection process using motion patterns, metadata and camera settings.

In another arrangement of the methods described, the arrangements can be used to warn users about user errors incurred during the asset management task process. User error such as forgetting to capture data at a sampling location, or tagging captured data with the wrong metadata are common in inexperienced users or users who have been carrying out a task for an extended period of time. FIG. 14 shows a method 1400 to prevent mistakes in the data collection process using the present invention. The example method 1400 may be implemented as one or more modules of the application 133, stored in the memory 106 and executed under control of the processor 105. If the method 1400 is executed on the computer module 101, real time communication occurs between the camera devices 401 and the computer module 101, for example via the network 120. Alternatively, as described below, the method 1400 relates to an application stored on one of the image capture devices 401 and executed on a processor of the image capture device.

Characteristics of inertial profiles, metadata and camera settings associated with each asset management tasks are stored as task profile models on the data collection device (the image capture device). These task profile models describe the expected conditions encountered during the carrying out of the tasks. The method 1400 begins at a check step 1401. Step 1401 (and correspondingly the method 1400) occurs as a user is carrying out an asset management task using one of the data collection devices 401 and operates to check user activity. If the user is still performing the data collection task ("Y" at step 1401), the method 1400 proceeds to a check image step 1402. Step 1402 operates to check if the user has captured an image (taken a photograph). If the user has taken a photograph ("Y" at step 1402), the method 1400 proceeds to a match inertial profile step 1403.

At step 1403 the current inertial profile from data collection device 401 is examined for a match to task profile models. The matching executed at step 1403 examines characteristics of the current inertial profile against characteristics of task profile models to determine a matching score between the current inertial profile and a model. The model may be determined by experimentation, for example from data for workers performing tasks using the pattern 504 along the vineyard 501. A match is found if the matching score exceeds a pre-determined threshold. The threshold can be determined by experimentation. If multiple models produce a matching score exceeding the pre-determined threshold, the model with the highest matching score is chosen. If no match is found ("N" at step 1403), the method 1400 returns to the check user activity step 1401. If a match is found ("Y" at step 1403), the method 1400 proceeds to an image-task verification step 1404.

At step 1404 the metadata and camera settings associated with the image taken by the user is checked for consistency with the task profile model. If there is consistency ("Y" at step 1404), then the method 1400 returns to check user activity step 1401. If there is a mismatch in metadata such as type of image, or a mismatch in camera settings such as focus distance in the image captured by the user at 1402 ("N" at 1404), the method 1400 proceeds to a warn user step 1405. At step 1405 a warning is presented to alert the user to re-capture the image with the expected metadata and camera settings or edit the metadata to fix any errors. The warning may be presented to the user using method such as a pop up on a screen of the camera, tactile camera gestures such as vibration, an audio message, or a combination of tactile, visual and audio methods. After the user has been warned, the method 1400 returns to the check user activity step 1401. Accordingly, if the current inertial profile starts to differ from a previously known inertial profile associated with the task, the imaging entity is alerted via the warning. Determining the matching score between the current inertial profile and the model at steps 1403 and 1404 relate to determining if the imaging entity is to be alerted.

If the user did not take a photograph at the check image step 1402 ("N" at step 1402), the method 1400 continues to a match inertial profile step 1413. Unlike the match inertial profile step 1403 where the current inertial profile is collected over a time period spanning a per-determined range before and after the capture of an image, the match inertial profile step 1413 only uses the inertial profile data collected over a time period immediately prior to the current time. If no match is found ("N" at step 1413), the method 1400 returns to the check user activity step 1401. If a match is found at match inertial profile step 1413 ("Y" at step 1413), the method 1400 proceeds to a check missed capture step 1414. Step 1414 operates to examine the matched task profile model from 1413 to check if the user has missed any expected image captures. If the user has captured the required photos ("N" at step 1414), the method 1400 proceeds from the check missed capture step 1414 back to the check user activity step 1401. If there are any missed captures ("Y" at step 1414), then the method 1400 continues to a warning step 1415. A warning to capture an image is presented to the user at capture warning step 1415. The warning may be implemented in a manner similar to step 1405. After the user has been warned, the method 1400 returns to check user activity step 1401. If the user has finished the data collection activity at step 1401 ("N" at step 1401), the method 1400 ends. The relevant application (whether the application 133 or an application executing on the camera) may determine that the user is not collecting data by receiving a signal switching off the camera, or receiving a signal indicating end of communication at the camera or the computer module 101. The relevant application (whether the application 133 or an application executing on the camera) may also determine that the user is not collecting data if communication with the camera has not occurred for over a pre-determined amount of time, the worker has completed the pattern 504 along the vineyard 501 or if metadata in one of the received images indicates an end of sequence.

Figure 15:
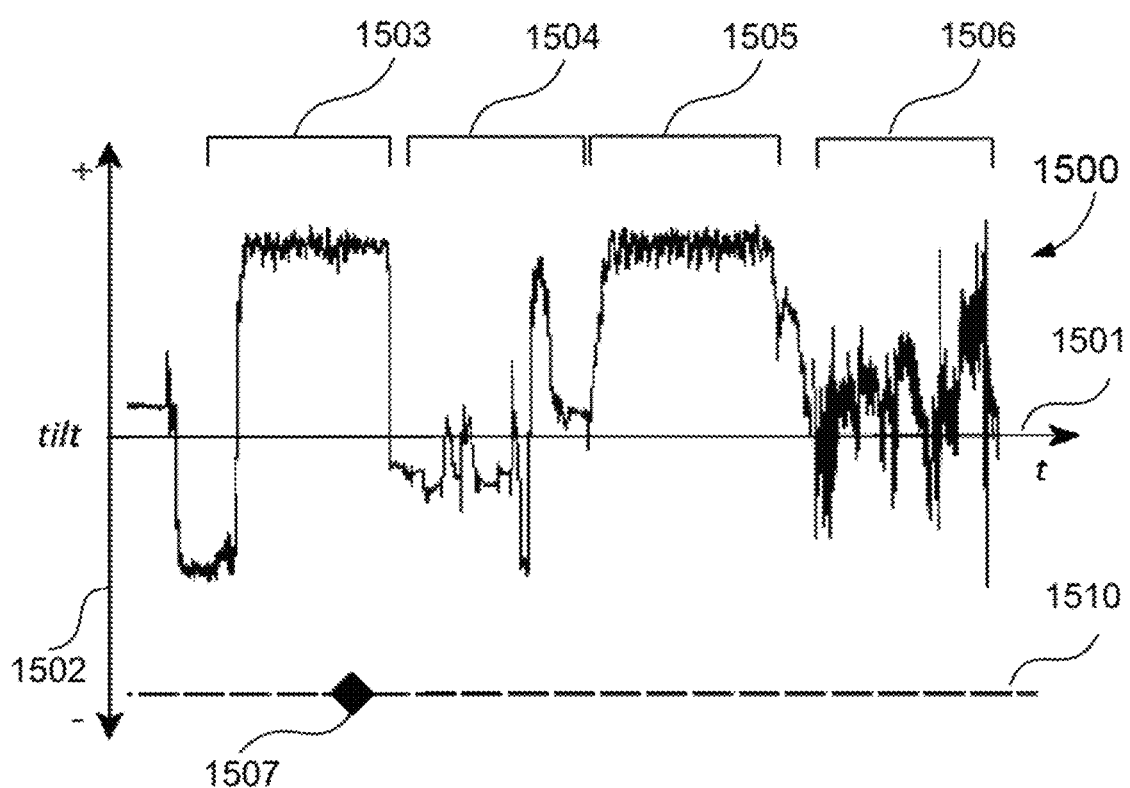
FIG. 15 is an example inertial profile demonstrating the utilisation of the method of warning users of user errors during the data collection process.

FIG. 15 illustrates an example inertial profile based on gyroscopic sensor data captured on a camera configured according to the arrangements described during a data collection task for counting fruiting nodes on grape vines in a vineyard 501. The inertial profile 1500 is represented as a graph having a horizontal time axis 1501, and a vertical axis 1502 indicating the amplitude (and sign) of the gyroscopic sensor reading. A horizontal image capture event axis 1510 is also shown. The task profile model for a user walking between pre-determined sampling locations 503 exhibits high energy movement and is reflected in the task profile model as a period of unstable gyroscopic sensor data. Example time periods that match the task profile model for a user walking between pre-determined sampling locations 503 are time periods 1504 and 1506. Conversely, the task profile model corresponding to a fruit node counting task consists of periods of low energy movement as the user pauses at a sampling location to observe and count fruiting node, preceded and followed by high energy movement as the user moves between pre-determined sampling locations 503. As such, the fruit node counting task profile model consists of an inertial profile with a period of stable gyroscopic sensor data with a minimum duration, preceded and followed by unstable gyroscopic sensor data. Example time periods that match the task profile model for a user performing the fruit node counting task are shown as time periods 1503 and 1505.

The fruit node counting task profile model also includes an image capture event near the end of the time period, where the image captured is tagged with a "canopy" type of image along with a count and camera settings where the combination of imaging device sensor size, lens focal length and focus distance can capture a field of view that encompasses a grape vine canopy which is consistent with camera position 1003 with a wide view of the vine canopy 1004. The image capture event axis 1510 shows a photo or image capture event 1507 that occurs at the end of time period 1503 where the inertial profile matches the fruit node counting task profile model. However, the user incorrectly tagged the image with the metadata "incidental" as type of image. In the example of FIG. 14, a warning is presented to the user by the warn user step 1405 to re-capture an image with the correct image type metadata. At another example time period 1505, the inertial profile indicates the user was carrying out a fruit node but the user forgot to capture an image at the end of time period 1505. A warning is presented to the user by the capture warning step 1415 near the end of time period 1505.

The above example was explained with reference to a use case in which the task profile models and method of warning users about user errors are stored and executed on a data collection device such as a camera. The arrangements described also have application in other device architectures where the task profile models and the method of warning users about user errors may be stored and executed remotely on a computing device connected remotely to the data collection device. In such an arrangement, the data collection device will push image capture event data and inertial profile data to the remote computing device, and any warnings will be received from the remote computing device to be displayed to the user.

Figure 16:
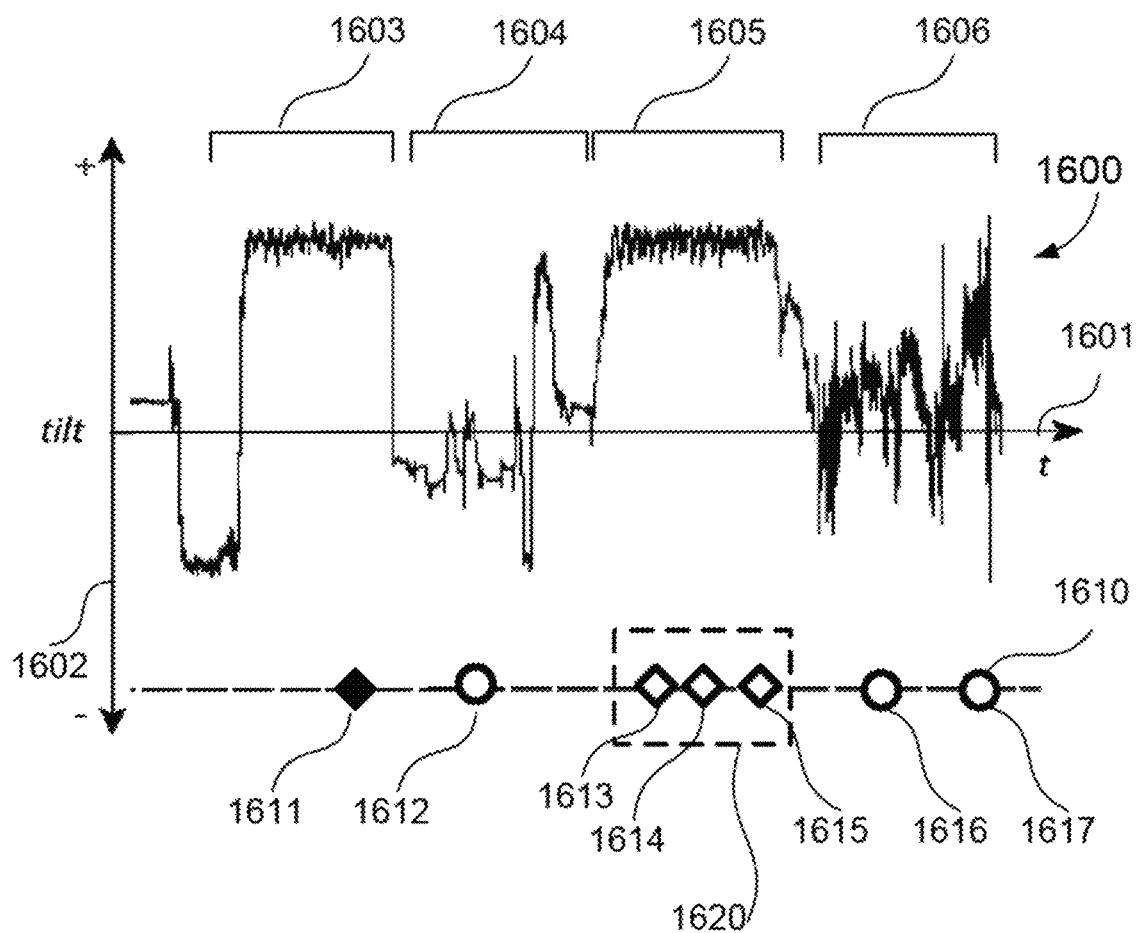
FIG. 16 is an example inertial profile demonstrating the grouping of images via motion patterns, metadata and camera settings for a user carrying out two data collection tasks.

In a further arrangement of the methods described, the image grouping step 303 may further group images by task profile models. FIG. 16 illustrates an example inertial profile 1600 for a user that is performing a primary fruit node counting task and a secondary disease assessment task in the vineyard 501. An image capture axis 1610 is also shown to indicate the timing of images captured by the user. The task profile model for both the fruit node counting and disease assessment tasks consist of similar inertial profiles, but differ in the image capture events, metadata and camera settings. Users can capture multiple disease photos at a sample site for the disease assessment task consisting of a canopy image and one or more disease images of grape bunch or leaves. Images associated with disease are tagged by "disease" image type in the metadata, and camera settings where the combination of imaging device sensor size, lens focal length and focus distance can capture a field of view that encompasses a close-up area of a vine (consistent with camera position 701). Therefore, in the image grouping step 303, an image group may be formed for images associated with primary and secondary tasks carried out by the user consisting of image captures 1611 and 1613-15. Another image group is formed for incidental photos consistent of image captures 1612, 1616 and 1617. The image group associated with tasks carried out by the user are then further grouped by task profile models into a primary node counting task-group consisting of image capture 1611, and a secondary disease assessment task-group 1620 consisting of image captures 1613-15. Further image grouping may then be performed on the basis of camera setting data associated with images of the captured image sequence.

The above examples are described with reference to a use case in which the managed asset is a vineyard and a bridge. The arrangements described also have application in other types of asset management activities, and are particularly relevant to scenarios in which location information is unreliable or impossible to obtain. In one example, the methods described may be utilised for monitoring a multistorey carpark, in order to perform routine inspection of the structure, condition of concrete, paint, road markings and other items that need regular maintenance. Other applications include managing sewer pipes, mineshafts and other underground tunnels, infrastructure assets such as electricity pylons or communications towers.

The arrangements described may further vary based on the implementation details related to where the various processing tasks are carried out. In some arrangements, an inertial profile is determined at step 302 during image capture time on the camera rather than by the application 133 executing on the computer module 101. In some arrangements, the camera only records raw sensor data during sequences of image capture, which are then downloaded with the accompanying image captures to the image data store 406, and the inertial profiles are determined in step 302 on the computing device 101 for which the image data store 405 is an available data source. In some arrangements, a complete sequence of sensor data is associated with a set of image captures, and the set of images and associated sensor data sequence downloaded to the image data store 406 as a self-contained set of captured information. While, in other arrangements the sequence of sensor data is segmented into shorter periods and directly associated or attached to individual image captures on the camera before being individually uploaded to the image data store 406.

In some arrangements, image group-forming step 303 is carried out on the camera, while in other arrangements it is carried out on a computing device for which the image data store 406 is an available data source.

The arrangements described are applicable to the computer and data processing industries and particularly for the imaging processing industries. In determining an inertial profile for an image and grouping images based on the inertial profile, relatively large numbers of images can be sorted for relevance with improved accuracy. Use of the inertial profile and metadata of the image can allow the application 133 to distinguish between images captured for different purposes. The improved accuracy can be achieved without relying on cumbersome manual entry of data, determination of location, and irrespective of generic features in the images or spurious or intermittent capturing of irrelevant images.

The foregoing describes only some embodiments of the present invention, and modifications and/or changes can be made thereto without departing from the scope and spirit of the invention, the embodiments being illustrative and not restrictive.

The invention claimed is:

1. A method of grouping images captured using an image capture device, the method comprising:
receiving a plurality of images, each of the plurality of images having associated camera settings;
determining an inertial profile for the plurality of images based on acceleration data of the image capture device or an imaging entity at pre-determined length of time before and after capture of the each of the plurality of images; and
forming image groups from the received plurality of images based on the determined inertial profile, and the associated camera settings; and
determining if the determined inertial profile over a time period prior to a current time matches a model to determine if an expected image has been missed.

2. The method according to claim 1, wherein the associated camera settings comprise at least one of a focus distance value, focal length, exposure or brightness values, and focus depth data.

3. The method according to claim 1, wherein the inertial profile comprises an orientation component relating to an orientation of the camera.

4. The method according to claim 1, wherein the imaging entity comprises the image capture device.

5. The method according to claim 4, wherein the imaging entity further comprises at least one of a person operating the image capture device, and a vehicle to which the image capture device is mounted.

6. The method according to claim 1, wherein forming image groups is further based on interaction of a user of the image capture device with one or more shutter buttons of the image capture device.

7. The method according to claim 1, wherein the image capture device comprises a plurality of shutter buttons configurable such that each shutter button records an image-subject type in metadata of the image.

8. The method according to claim 1, further comprising associating each of the formed image groups with one of a pre-determined set of tasks.

9. The method according to claim 1, further comprising grouping the images by distinguishing a task from a set of pre-determined tasks based on the determined inertial profile.

10. The method according to claim 1, wherein forming image groups is further based on a task tag stored during capture of each of the plurality of images.

11. The method according to claim 1, further comprising normalising inertial profiles determined for each of the plurality of images, and wherein the image groups are formed using the normalised inertial profiles.

12. The method according to claim 1, wherein the imaging entity includes the image capturing device mounted on a tractor and the plurality of images are of crops.

13. The method according to claim 1, wherein the image groups are formed further based on a frequency of interaction of a user of the image capture device with one or more shutter buttons of the image capture device.

14. The method according to claim 1, wherein the image groups are formed further based on identifying a pattern of inertial profiles for images within each of the groups.

15. A method of grouping images captured using an image capture device, the method comprising:
receiving a plurality of images, each of the plurality of images having associated camera settings;
determining an inertial profile for the plurality of images based on acceleration data of the image capture device or an imaging entity at pre-determined length of time before and after capture of the each of the plurality of images;
forming image groups from the received plurality of images based on the determined inertial profile, and the associated camera settings; and
determining if a current inertial profile starts to differ from a previously known inertial profile, and alerting the imaging entity.

16. A method of grouping images captured using an image capture device, the method comprising:
receiving a plurality of images, each of the plurality of images having associated camera settings;
determining an inertial profile for the plurality of images based on acceleration data of the image capture device or an imaging entity at pre-determined length of time before and after capture of the each of the plurality of images;
forming image groups from the received plurality of images based on the determined inertial profile, and the associated camera settings; and
determining a matching score between a current inertial profile and a model to determine if the imaging entity is to be alerted.

17. A non-transitory computer readable storage medium storing program instructions for grouping images captured using an image capture device, the program comprising:
code for receiving a plurality of images, each of the plurality of images having associated camera settings;
code for determining an inertial profile for the plurality of images based on acceleration data of the image capture device or an imaging entity at pre-determined length of time before and after capture of the each of the plurality of images; and code for forming image groups from the received plurality of images based on the determined inertial profile, and the associated camera settings; and code for determining if the determined inertial profile over a time period prior to a current time matches a model to determine if an expected image has been missed.

18. Apparatus for grouping images captured using an image capture device, comprising:

one or more processors; and one or more memory devices storing a software program for directing the one or more processors to perform a method comprising the steps of:

receiving a plurality of images, each of the plurality of images having associated camera settings;

determining an inertial profile for the plurality of images based on acceleration data of the image capture device or an imaging entity at pre-determined length of time before and after capture of the each of the plurality of images; and forming image groups from the received plurality of images based on the determined inertial profile, and the associated camera settings; and determining if the determined inertial profile over a time period prior to a current time matches a model to determine if an expected image has been missed.

19. A system comprising:

an image capture device;

one or more processors; and one or more memory devices storing a software program for directing the one or more processors to perform a method comprising the steps of:

receiving a plurality of images captured by the image capture device, each of the plurality of images having associated camera settings;

determining an inertial profile for the plurality of images based on acceleration data of the image capture device or an imaging entity at pre-determined length of time before and after capture of the each of the plurality of images; and forming image groups from the received plurality of images based on the determined inertial profile, and the associated camera settings; and determining if the determined inertial profile over a time period prior to a current time matches a model to determine if an expected image has been missed.

* * * * *